United States Patent
Dai et al.

(10) Patent No.: US 9,959,865 B2
(45) Date of Patent: May 1, 2018

(54) INFORMATION PROCESSING METHOD WITH VOICE RECOGNITION

(71) Applicants: Beijing Lenovo Software Ltd., Haidian District, Beijing (CN); Lenovo (Beijing) Co., Ltd., Beijing (CN)

(72) Inventors: Haisheng Dai, Beijing (CN); Qianying Wang, Beijing (CN); Hao Wang, Beijing (CN); Lifeng Fan, Beijing (CN); Tianshu Wang, Beijing (CN); Xiangyang Li, Beijing (CN)

(73) Assignees: BEIJING LENOVO SOFTWARE LTD., Haidian District, Beijing (CN); LENOVO (BEIJING) CO., LTD., Haidian District, Beijing (CN)

( * ) Notice: Subject to any disclaimer, the term of this patent is extended or adjusted under 35 U.S.C. 154(b) by 225 days.

(21) Appl. No.: 14/079,219

(22) Filed: Nov. 13, 2013

(65) Prior Publication Data
US 2014/0136215 A1  May 15, 2014

(30) Foreign Application Priority Data

Nov. 13, 2012 (CN) .......................... 2012 1 0454965
Nov. 20, 2012 (CN) .......................... 2012 1 0473513
Dec. 17, 2012 (CN) .......................... 2012 1 0548625

(51) Int. Cl.
*G10L 15/22* (2006.01)
(52) U.S. Cl.
CPC .................................. *G10L 15/22* (2013.01)
(58) Field of Classification Search
CPC . G10L 15/28; G10L 15/32; G06F 1/32; G06F 1/3206

(Continued)

(56) References Cited

U.S. PATENT DOCUMENTS 5,583,965 A * 12/1996 Douma ................... G10L 15/26
                                                            704/246
5,983,186 A * 11/1999 Miyazawa .............. G10L 15/26
                                                            704/233

(Continued)

FOREIGN PATENT DOCUMENTS

CN          1722230         1/2006
CN          1723487         1/2006

(Continued)

OTHER PUBLICATIONS

First Office Action dated May 20, 2015 out of Chinese priority Application No. 201210473513.5 (10 pages).

(Continued)

*Primary Examiner* — Michael N Opsasnick
(74) *Attorney, Agent, or Firm* — Brinks Gilson & Lione; G. Peter Nichols

(57) ABSTRACT

The present invention provides information processing method and electronic apparatus. The method is applied in an electronic apparatus having voice recognition service, and the method includes: obtaining first voice information; recognizing the first voice information by a first recognition model to obtain a first recognition result; deciding whether the first recognition result conforms to a first preset condition; recognizing the first voice information by a second recognition model different from the first recognition model to obtain a second recognition result when the first recognition result conforms to the first preset condition; and controlling the electronic apparatus to execute a corresponding control instruction based on the second recognition result.

19 Claims, 9 Drawing Sheets

(58) Field of Classification Search
USPC .......................................... 704/270, 275–277
See application file for complete search history.

(56) References Cited

U.S. PATENT DOCUMENTS

| | | | |
|---|---|---|---|
| 6,834,265 B2 | 12/2004 | Balasuriya | |
| 7,174,299 B2 | 2/2007 | Fujii | |
| 7,366,921 B2* | 4/2008 | Ranganathan | G06F 1/3215 713/300 |
| 8,589,156 B2 | 11/2013 | Burke | |
| 8,768,707 B2* | 7/2014 | Mozer | G10L 17/22 704/231 |
| 8,862,478 B2 | 10/2014 | Nakamura | |
| 8,898,065 B2 | 11/2014 | Newman | |
| 8,930,194 B2 | 1/2015 | Newman | |
| 8,996,381 B2* | 3/2015 | Mozer | G10L 15/22 704/231 |
| 2002/0046023 A1 | 4/2002 | Fujii | |
| 2004/0117179 A1 | 6/2004 | Balasuriya | |
| 2004/0220798 A1* | 11/2004 | Chi | B60R 25/257 704/201 |
| 2005/0114132 A1 | 5/2005 | Hsu | |
| 2005/0182631 A1* | 8/2005 | Lee | G10L 15/22 704/275 |
| 2005/0240786 A1* | 10/2005 | Ranganathan | G06F 1/3215 713/320 |
| 2006/0009980 A1 | 1/2006 | Burke | |
| 2006/0028337 A1* | 2/2006 | Li | G08C 17/00 340/539.1 |
| 2008/0167860 A1* | 7/2008 | Goller | G06F 8/65 704/201 |
| 2009/0030696 A1* | 1/2009 | Cerra | G10L 15/30 704/275 |
| 2012/0022872 A1* | 1/2012 | Gruber | G06F 17/279 704/270.1 |
| 2012/0179457 A1 | 7/2012 | Newman | |
| 2012/0179463 A1 | 7/2012 | Newman | |
| 2012/0179464 A1 | 7/2012 | Newman | |
| 2012/0179469 A1 | 7/2012 | Newman | |
| 2012/0179471 A1 | 7/2012 | Newman | |
| 2012/0197629 A1 | 8/2012 | Nakamura | |
| 2013/0253937 A1* | 9/2013 | Cho | G06F 3/167 704/275 |
| 2015/0142438 A1* | 5/2015 | Dai | G10L 17/22 704/246 |

FOREIGN PATENT DOCUMENTS

| | | |
|---|---|---|
| CN | 101030130 | 9/2007 |
| CN | 101441869 | 5/2009 |
| CN | 201307938 | 9/2009 |
| CN | 101840700 | 9/2010 |
| CN | 101867742 | 10/2010 |
| CN | 102025834 | 4/2011 |
| CN | 102118886 | 7/2011 |
| CN | 102316227 | 1/2012 |
| CN | 102324241 | 1/2012 |
| CN | 102549653 | 7/2012 |
| CN | 102682771 | 9/2012 |

OTHER PUBLICATIONS

First Office Action dated Jan. 14, 2016 out of Chinese priority Application No. 201210454965.9 (12 pages including English translation).
Second Office Action dated Mar. 4, 2016 out of Chinese priority Application No. 201210473513.5 (11 pages including English translation).
First Office Action dated May 4, 2016 out of Chinese priority Application No. 201210548625.2 (36 pages including English translation).
Third Office Action dated Dec. 6, 2016 (9 pages including English translation) out of Chinese priority application 201210454965.9.
Second Office Action dated Dec. 30, 2016 (37 pages including English translation) out of Chinese priority application 201210548625.2.
Office Action, and English language translation thereof, in corresponding Chinese Application No. 201210473513.5 dated Aug. 22, 2016, 11 pages.
Office Action, and English language translation thereof, in corresponding Chinese Application No. 201210454965.9 dated Aug. 25, 2016, 9 pages.
Fourth Office Action dated Apr. 17, 2017 (9 pages including English translation) out of Chinese priority application 201210454965.9.

\* cited by examiner

INFORMATION PROCESSING METHOD WITH VOICE RECOGNITION

INFORMATION PROCESSING METHOD AND ELECTRONIC APPARATUS

This application claims priority to Chinese Patent Application No. 201210454965.9 filed on Nov. 13, 2012; Chinese Patent Application No. 201210473513.5 filed on Nov. 20, 2012, and Chinese Patent Application No. 201210548625.2 filed on Dec. 17, 2012; the entire contents of which are incorporated herein by reference.

BACKGROUND

The present invention relates to the field of electronic technology, and in particular to information processing method and electronic apparatus.

With the development of electronic technique, for convenience of man-machine interaction, more and more electronic apparatus have voice recognition service integrated thereon, so the user can control the electronic apparatus through voice conveniently, without depending on any physical control device such as a mouse, a keyboard.

In the prior art, the operational procedure using voice recognition service is generally that: a sound recording device such as a microphone records sound information in real time, and transmits the sound information recorded in real time to a voice recognition module in real time, and then the voice recognition module carries out a series of processing to the sound information, for example, pre-processing including filtering, sampling and quantifying, windowing or the like is carried out first; then the pre-processed speech signal is carried out characteristic parameter extraction to obtain a characteristic vector, then the acquired characteristic vector is compared with each template in the template library for degree of similarity, and the one with the highest degree of similarity is output as a recognition result. And the template in the template library is trained in advance, that is, each word in the word table is said once, and the characteristic quality thereof is stored in the template library as template. Then a corresponding operational command is acquired according to correspondence relationship between the recognition result and the operational command, then a corresponding operation is carried out according to the operational command.

However, the inventor of the present invention finds out that in the procedure of implementing the present invention, the solution of the prior arts needs to carry out the aforementioned recognition flows until a result is recognized no matter what sound information is recorded and there is or there is no the corresponding operational command, however, in the practice application, sound information recorded by a microphone sometimes may be not sound of a user, even not sound of human, if it is processed according to the above-described recognition flows, then the proportion of the real effective sound command of the overall recognition quantity is relatively low, that is, the rate of voice recognition is relatively low, and meantime the recognition efficiency is influenced to be low.

SUMMARY

The present invention provides information processing method and electronic apparatus for solving the technical problem that all of the sound information is carried out complete recognition flow and results in low voice recognition rate and low recognition efficiency in the prior arts.

An aspect of the present invention provides an information processing method applied in an electronic apparatus having voice recognition service, the method including: obtaining first voice information; recognizing the first voice information by a first recognition model to obtain a first recognition result; deciding whether the first recognition result conforms to a first preset condition; when the first recognition result conforms to the first preset condition, recognizing the first voice information by a second recognition model different from the first recognition model to obtain a second recognition result; controlling the electronic apparatus to execute a corresponding control instruction based on the second recognition result.

Optionally, when the first recognition result does not conform to the first preset condition, the method further includes: discarding the first voice information.

Optionally, before recognizing the first voice information by the first recognition model, the method further includes: deciding whether the first voice information satisfies a second preset condition; when the first voice information does not satisfy the second preset condition, discarding the first voice information; when the first voice information satisfies the second preset condition, executing a step of recognizing the first voice information by the first recognition model.

Optionally, recognizing the first voice information by the first recognition model to obtain the first recognition result specifically is: recognizing whether the user corresponding to the first voice information is a predetermined user to obtain the first recognition result; wherein, when the user corresponding to the first voice information is not the predetermined user, it represents that the first voice information does not satisfy the first preset condition, and when the user corresponding to the first voice information is the predetermined user, it represents that the first voice information satisfies the first preset condition.

Optionally, obtaining the first voice information specifically includes: carrying out end-point detection to the first voice information to obtain the detected first voice information.

Optionally, when the first recognition result conforms to the first preset condition, recognizing the first voice information by the second recognition model different from the first recognition model to obtain the second recognition result specifically is: recognizing the first voice information by the second recognition model to obtain a third recognition result; obtaining the second recognition result based on the first recognition result and the third recognition result.

Optionally, the voice recognition service is in an inactive status, and when the control instruction corresponding to the second recognition result is a wakening instruction, controlling the electronic apparatus to execute the corresponding control instruction based on the second recognition result specifically is: executing the wakening instruction to waken the voice recognition service.

Another aspect of the present invention provides an electronic apparatus having voice recognition service, the electronic apparatus including: a circuit board; a sound acquiring unit connected to the circuit board and for obtaining first voice information; a processing chip provided on the circuit board and for recognizing the first voice information by a first recognition model to obtain a first recognition result; deciding whether the first recognition result conforms to a first preset condition; recognizing the first voice information by a second recognition model different from the first recognition model to obtain a second recognition result when the first recognition result conforms to the first preset condition; a control chip provided on the circuit board and for controlling the electronic apparatus to execute a corresponding control instruction based on the second recognition result.

Optionally, the processing chip is further specifically for discarding the first voice information when the first recognition result does not conform to the first preset condition.

Optionally, the processing chip includes a first sub-processing chip and a second sub-processing chip, the first sub-processing chip is specifically for deciding whether the first voice information satisfies a second preset condition; discarding the first voice information when the first voice information does not satisfy the second preset condition; and the second sub-processing chip is specifically for recognizing the first voice information by the first recognition model when the first voice information satisfies the second preset condition.

Optionally, the processing chip further specifically includes a third sub-processing chip, which is specifically for recognizing whether the user corresponding to the first voice information is a predetermined user to obtain the first recognition result; wherein, when the user corresponding to the first voice information is not the predetermined user, it represents that the first voice information does not satisfy the first preset condition, and when the user corresponding to the first voice information is the predetermined user, it represents that the first voice information satisfies the first preset condition.

Optionally, the sound acquiring unit further includes a detecting chip for carrying out end-point detection to the first voice information to obtain the detected first voice information.

Optionally, the processing chip further includes a fourth sub-processing chip for recognizing the first voice information by the second recognition model to obtain a third recognition result when the first recognition result conforms to the first preset condition and obtaining the second recognition result based on the first recognition result and the third recognition result.

Optionally, the voice recognition service is in an inactive status, when the control instruction corresponding to the second recognition result is a wakening instruction, the control chip is specifically for executing the wakening instruction to waken the voice recognition service.

One or more technical solutions provided by the embodiments of the present invention at least have the following technical effects or advantages:

In the embodiments of the present invention, the voice information is carried out a first step recognition by the first recognition model, and then whether the result conforms to the first preset condition is decided according to the result of the first step recognition, that is, whether the recognition is continued is decided, and only when the preset condition is satisfied, a next step recognition is carried out by the second recognition model to obtain a recognition result, and a corresponding control instruction is executed according to the recognition result. Thus, since with the filtering of the first step recognition, only the one that conforms to the condition is recognized continuously, so the proportion of the recognition result obtained finally being a valid recognition result is increased, that is, the recognition rate is increased, and the voice information intercepted by the first step does not need to be carried out a recognizing operation continuously, so recognizing efficiency is increased.

Further, in the embodiments of the present invention, the voice information that does not conform to the preset condition is discarded directly without being carried out subsequent processing, so the unnecessary calculating amount is reduced significantly, and the electric power is saved since the second recognition model does not need to calculate.

Still further, in the embodiments of the present invention, before recognizing by the first recognition model, a deciding condition is further set to deciding whether the voice information itself conforms to a second preset condition directly, and when it does not conform to the second preset condition, the first voice information is discarded directly without being recognized by the first recognition model, so the electric power is further saved, and the calculating amount is further reduced.

Still further, in the embodiments of the present invention, the second recognition result is obtained finally by the first recognition model and the second recognition model is only for determining whether the control instruction corresponding to the second recognition result is the wakening instruction, when it is the wakening instruction, the voice recognition service is wakened to let the voice recognition service execute the subsequent voice command to carry out recognition, and if it is not the wakening instruction, it is monitored continuously until the wakening instruction is detected, thus, the actual voice recognition service is in an inactive status all through, so the electric power and calculating amount is saved significantly.

DETAILED DESCRIPTION

Hereinafter, the above-described first to eighth embodiments of the invention will be described in detail with reference to the accompanying drawings as follows.

The first embodiment of the invention provides information processing method and electronic apparatus for solving the technical problem that all of the sound information is carried out complete recognition flow and results in low voice recognition rate and low recognition efficiency in the prior arts.

The overall concept of the technical solution in the first embodiment of the invention for solving the above technical problem is as follows:

The voice information is carried out a first step recognition by the first recognition model, and then whether the result conforms to the first preset condition is decided according to the result of the first step recognition, that is, whether the recognition is continued is decided, and only when the preset condition is satisfied, a next step recognition is carried out by the second recognition model to obtain a recognition result, and a corresponding control instruction is executed according to the recognition result. Thus, since with the filtering of the first step recognition, only the one that conforms to the condition is recognized continuously, so the proportion of the recognition result obtained finally being a valid recognition result is increased, that is, recognition rate is increased, and the voice information intercepted by the first step does not need to be carried out a recognizing operation continuously, so recognizing efficiency is increased.

For understanding the above-described technical solution better, the above-described technical solution is explained in detail in combination with the accompanying drawings of the specification and the specific implementation modes.

The first embodiment of the invention provides a voice recognition method applied in an electronic apparatus, which for example is a mobile phone, a PDA (Personal Digital Assistant), a tablet computer or a notebook computer. The electronic apparatus has voice recognition service.

Figure 1:
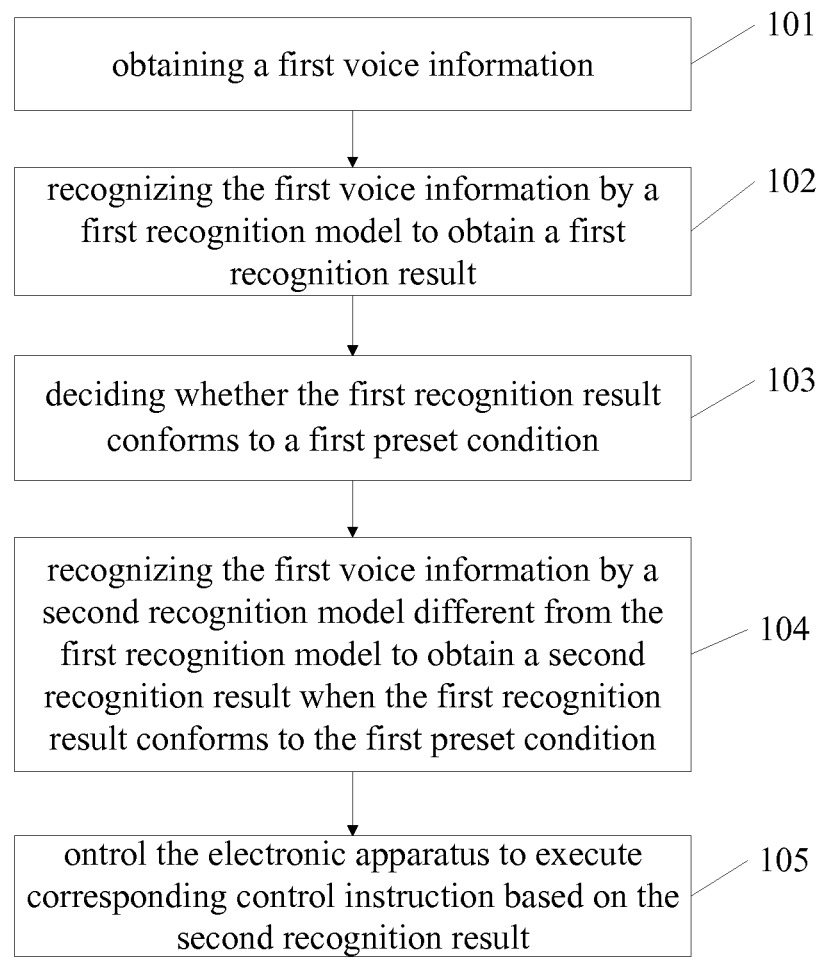
FIG. 1 is flow chart of the voice recognition method of the first embodiment of the present invention.

Next, referring to FIG. 1, FIG. 1 is a flow chart of the voice recognition method of the present embodiment, the method includes:

Step 101: obtaining first voice information;

Step 102: recognizing the first voice information by a first recognition model to obtain a first recognition result;

Step 103: deciding whether the first recognition result conforms to a first preset condition;

Step 104: when the first recognition result conforms to the first preset condition, recognizing the first voice information by a second recognition model different from the first recognition model to obtain a second recognition result;

Step 105: controlling the electronic apparatus to execute a corresponding control instruction based on the second recognition result.

The implementation procedure of the voice recognition method of the present embodiment is described in detail according to different application scenes as follows.

In the first embodiment, it is assumed that the voice recognition service is already enabled. In step 101, for example, the first voice information is obtained by recording voice information in real time by a microphone, in the specific implementation procedure, the first voice information may also be carried out end-point detection, for example, be carried out end-point detection based on short-time energy and short-time average zero passage dose rate, to determine a start point and an end point of the voice accurately from the acquired sound signal and distinguish a voice signal and a non-voice signal, so as to reduce collection amount of the first voice information, save work amount of subsequent steps, exclude interference of a silence segment or a noise segment and improve performance of the voice recognition service. In the following respective embodiments, the first voice information may be voice information after being carried out end-point detection, and may be also voice information without being carried out end-point detection, the implementation of the subsequent steps are similar to each other.

Then step 102 is executed, that is, the first voice information acquired is recognized by the first recognition model to obtain the first recognition result, in the specific implementation procedure, the first recognition model may have many implementation modes which are explained by example respectively as follows.

First, the first recognition model is for example a voice recognition model of specific user, when the first voice information is acquired in step 101, whether the user corresponding to the first voice information is a predetermined user is recognized by the first recognition model, that is, whether the first voice information is issued by the predetermined user is recognized specifically by voiceprint comparison for example, i.e., whether the degree of similarity of the voiceprint exceeds a preset condition, in the present embodiment, the first preset condition is for example that the value of the degree of similarity is greater than or equal to 98%; it is assumed that the recognition result of the first voice information is the value of the degree of similarity is 99%, then the 99% is compared with the first preset condition of 98%, the result is YES, it represents that the first voice information is issued by the predetermined user; and it is assumed that the recognition result of the first voice information is the value of the degree of similarity is 97%, then the 97% is compared with the first preset condition of 98%, the result is NO, it represents that the first voice information is not issued by the predetermined user.

Second, the first recognition model is a simple recognition model, that is, only one or two characteristics in the first voice information are recognized, and then a recognition result of this one or two characteristics is obtained, in the present embodiment, the first preset condition is for example that the score of match degree of this one or two characteristics should reach a certain threshold, when the score of match degree in the first recognition result is greater than or equal to the threshold, it is determined that the first recognition result conforms to the first preset condition. Since only one or two characteristics are recognized, the calculating amount is relatively small.

Third, the first recognition model is a simple recognition model and which is different from the second is that, the simple recognition model in the present embodiment is to recognize all of the sound characteristics, but a fuzzy algorithm is adopted, that is, the algorithm is relatively simple to carry out fuzzy matching, so the calculating amount is much less than a accurate calculation and a precise matching. Then, in the present embodiment, the first recognition result is obtained by such simple recognition model, and then whether the possibility of the first voice information being a voice command exceeds a threshold, i.e., the first preset condition, is decided, if the possibility is greater than or equal to the threshold, it represents that the first recognition result conforms to the first preset condition.

The three cases of the first recognition model are explained by example above, however, in practical application, the first recognition model may also be other models, as long as the calculating amount is smaller than the calculating amount of only one recognition in the entire recognition procedure of the prior arts, this application does not make any limitation thereto.

When it is recognized by the above first recognition model and it is decided that the first recognition result conforms to the first preset condition, step 104 is executed, that is, the first voice information is further recognized by the second recognition model, the second recognition model is explained by example corresponding to the above three kinds of first recognition model as follows.

First, when the first voice information is determined as being issued by the predetermined user, it represents that the first voice information is issued by an authorized user, then the first voice information can be further recognized, at this time, the second recognition model is enabled to recognize the first voice information, the specific flow is for example extracting a characteristic parameter to obtain a characteristic vector firstly, then comparing the degree of similarity between the acquired characteristic vector with each template in the template library, and outputting the one with the highest degree of similarity as the recognition result, which is the same as the recognition flow in the prior arts, and the second recognition result can be obtained after such recognition.

Second, the second recognition model is a complicate recognition model, that is, additional characteristics other than the characteristic recognized by the first recognition model, for example, three, five or even more characteristics are recognized, and also all of the characteristics may be recognized once over, and one recognition result, i.e., the second recognition result is obtained by recognizing finally. In particular, if only the remaining characteristics are analyzed, the first recognition result and the recognition result obtained by using the second recognition model are considered comprehensively, for example, score and weight of each characteristic are considered to obtain the second recognition result finally.

Third, the second recognition model is a complicate recognition model, correspondingly, it is different from the second complicate recognition model in that the complicate recognition model in the present embodiment carries out precise matching by adopting a precise algorithm, so that a more accurate recognition result, i.e., the second recognition result, can be obtained. Of course, the first recognition result can also be considered, for example, the two recognition results are given different weights, and the second recognition result corresponding to the first voice information is determined finally.

Similarly, the above-described three kinds of modes of the second recognition model are only examples and are not for limiting the present invention, as long as a model capable of determining a recognition result of a voice command according to a recognition result can be obtained by recognition by the second recognition model.

After the second recognition result is obtained by the above-described method or other methods, step 105 is executed, that is, the electronic apparatus is controlled to execute a corresponding control instruction based on the second recognition result. In the specific implementation procedure, for example, a corresponding voice command is determined according to the second recognition result firstly, and then a corresponding control instruction is executed according to the voice command. And the voice command corresponding to the second recognition result is for example a command for making phone call, a command for editing message, and other commands in the practical application, this application does not make any limitation thereto.

It is known from the above description, since with the filtering of the first step, only the one that conforms to the condition is recognized continually, so the proportion of the recognition result obtained finally being a valid recognition result is increased, that is, recognition rate is increased, and the voice information intercepted by the first step does not need to be carried out a recognizing operation continually, so recognizing efficiency is increased.

In a further embodiment, when the result of decision is that the first recognition result does not conform to the first preset condition in step 103, the first voice information is discarded directly without being recognized subsequently, so unnecessary calculating amount is reduced significantly, and the second recognition model does not need to calculate, the electric power is saved.

In order to further save electric power and reduce calculating amount, in the present embodiment, whether the first voice information satisfies a second preset condition is decided directly before executing step 102, and when the first voice information does not satisfy the second preset condition, the first voice information is discarded; and step 102 is executed when the first voice information satisfies the second preset condition.

In particular, whether the first voice information is human sound instead of noise for example wind sound, metallic sound in a construction site or animal sound (for example, sound of dog or cat) is decided, and step 102 is executed if the first voice information is human sound, if not, the first voice information is discarded directly, so the calculating amount of the first recognition model and that of the second recognition model are saved, and since the first recognition model and the second recognition model do not need to calculate, the power consumption is reduced.

In another implementation mode, the second preset condition may be also whether the user corresponding to the first voice information is a predetermined user as above mentioned, if the result of decision represents that the user corresponding to the first voice information is not the predetermined user, it shows that the user corresponding to the first voice information does not have control authority to the electronic apparatus, so step 102 and the subsequent respective steps are not executed, instead the first voice information is discarded directly.

In the second implementation mode, it is assumed that the voice recognition service is not enabled at this time, since if the voice recognition service is in an active status all the time, the flow of voice recognition would be carried out all the time, it causes a large power consumption and calculating amount, so, a waken applet is resided at a backstage of the operating system of the electronic apparatus in the present embodiment, whether the user's instruction is a wakening instruction is recognized by the waken applet, and the voice recognition service is enabled if so, the implementation procedure of the voice recognition method in the present embodiment is explained by specific examples as follows.

The waken applet monitors the sound recorded by the sound recording device all the time, that is, obtains the first voice information in step 101, then step 102 is executed, in the present embodiment, the first recognition model may adopt for example the three kinds of models described in the first embodiment, of course it may decide whether the first voice information is human sound, if it is human sound, step 104 is executed; when the decision result in step 103 conforms to the first preset condition, then the second recognition result is obtained by recognizing by the second recognition model. Then the second recognition result is compared to decide whether it is a wakening instruction, in the present embodiment, the waken applet is set to include only two voice commands, one is voice recognition on service, the other is voice recognition OFF service, so the comparison of the second recognition result is only a comparison of two times, so that whether the one corresponding to the second recognition result is the wakening instruction is determined, so the speed of comparison is fast, and calculating amount is small, and electric quantity can be saved.

When the one corresponding to the second recognition result is the wakening instruction, then, step 105 specifically is executing the wakening instruction to waken the voice recognition service, thus, the voice recognition service is enabled, and the user can interact with the electronic apparatus through voice. Similarly, the voice recognition service can be disabled in such manner to save electric power, and then the waken applet continues to monitor until the wakening instruction is detected, then the voice recognition service is wakened.

For example, the current voice recognition service has already been in an inactive status, the user says "little secretary" to the electronic apparatus at this time, then the waken applet will detect it, and carry out decision of the aforementioned second preset condition firstly to decide it is human sound found, then step 102 is executed, that is, it recognizes by the first recognition model to obtain a recognition result, for example, it recognizes by a fuzzy recognition and finds that it may be the wakening instruction, so it carries out a precise recognition by using the second recognition model continually to obtain the second recognition result, and finds that it is exactly the wakening instruction, then step 105 is executed, that is, to execute the wakening instruction, to control the electronic apparatus to enable the voice recognition service.

And, for example, if the user haven't talk yet, it is only the kitty in the room shouts, when the waken applet detects it, it decides that it is not human sound found, and the voice information is discarded directly, and the waken applet monitors continually.

Also, for example, when the first step decision is passed, that is, it is human sound, then it decides with step 101, to find for example the voice information isn't issued by the user, so the voice information is still discarded, and the monitoring is continued.

Also, for example, when step 104 is executed, the second recognition result is not the wakening instruction by comparison, then the waken applet continues to monitor the sound information recorded from the sound recording device at this time, until "little secretary" is detected, the voice recognition service is wakened.

The above respective implementation modes can be implemented individually or in combination with each other, those skilled in the art can make an option according to practical situations.

The third implementation mode, in this implementation mode, the second recognition model in the first implementation mode is the voice recognition service in the second implementation mode, and the first recognition model in the first implementation mode is the waken applet in the second implementation mode, so, when the waken applet decides that the first recognition result conforms to the first preset condition, for example, the waken applet decides whether the user of the first voice information is the predetermined user, i.e., it is the predetermined user issuing the voice command, so the second recognition model is wakened so that the second recognition model can enter a working status and further recognizes what the voice command corresponding to the first voice information is, for example, a command of making phone call. If it is not the predetermined user, then the second recognition model is not wakened, so in this implementation mode, after step 103 and before step 104, there further includes a step of wakening the second recognition model when the first recognition result conforms to the first preset condition.

Figure 2:
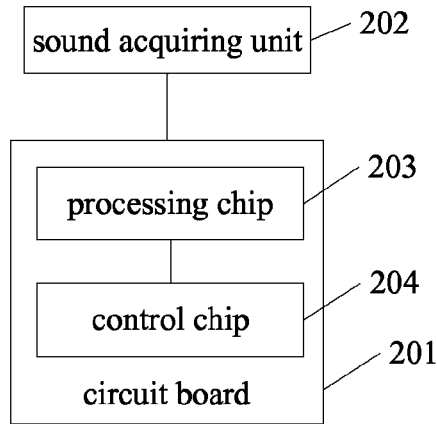
FIG. 2 is a structural diagram of the electronic apparatus of the first embodiment of the present invention.

Based on the same inventive concept, the specific architecture of the electronic apparatus for implementing the above-described voice recognition method in the embodiments of the present invention is described as follows, with reference to FIG. 2, the electronic apparatus includes: a circuit board 201; a sound acquiring unit 202 connected to the circuit board 201 and for obtaining the first voice information; a processing chip 203 provided on the circuit board 201 and for recognizing the first voice information by the first recognition model to obtain the first recognition result; deciding whether the first recognition result conforms to the first preset condition; recognizing the first voice information by the second recognition model different from the first recognition model to obtain the second recognition result when the first recognition result conforms to the first preset condition; and a control chip 204 provided on the circuit board 201 and for controlling the electronic apparatus to execute a corresponding control instruction based on the second recognition result.

Further, the processing chip 203 is specifically further for discarding the first voice information when the first recognition result does not conform to the first preset condition.

In one embodiment, the processing chip 203 includes a first sub-processing chip and a second sub-processing chip, the first sub-processing chip is specifically for deciding whether the first voice information satisfies the second preset condition; discarding the first voice information when the first voice information does not satisfy the second preset condition; and when the first voice information satisfies the second preset condition, the second sub-processing chip is specifically for recognizing the first voice information by the first recognition model.

Further, the processing chip 203 further specifically includes a third sub-processing chip specifically for recognizing whether the user corresponding to the first voice information is a predetermined user to obtain the first recognition result; wherein, when the user corresponding to the first voice information is not the predetermined user, it represents that the first voice information does not satisfy the first preset condition, and when the user corresponding to the first voice information is the predetermined user, it represents that the first voice information satisfies the first preset condition.

Further, the processing chip 203 further includes a fourth sub-processing chip for recognizing the first voice information by the second recognition model to obtain the third recognition result when the first recognition result conforms to the first preset condition; and obtaining the second recognition result based on the first recognition result and the third recognition result.

In another implementation mode, the sound acquiring unit 201 further includes a detect chip for carrying out end-point detection to the first voice information to obtain the detected first voice information. Wherein, the detect chip may also be provided on the circuit board 201.

In another implementation mode, the voice recognition service is in an inactive status, and when the control instruction corresponding to the second recognition result is a wakening instruction, the control chip 204 is specifically for executing the wakening instruction to waken the voice recognition service.

Wherein, the sound acquiring unit is for example a microphone, which may be one microphone, and may be also a microphone array.

Further, the processing chip 203 and the control chip 204 may be two separate chips, and may be also integrated on the same chip.

And the first sub-processing chip, the second sub-processing chip, the third sub-processing chip and the fourth sub-processing chip of the processing chip 203 may be four independent chips, and may be also integrated on the same chip.

The modified manners and specific examples in the above-mentioned voice recognition method can be applied in the electronic apparatus in the present embodiment likewise, and those skilled in the art can understand the implementing method of the electronic apparatus in the present embodiment by the detailed description of the above voice recognition method, thus no more description is provided for simplicity of the specification.

One or more technical solutions provided by the first embodiment of the invention at least have the following technical effects or advantages:

In the first embodiment of the present invention, the voice information is carried out a first step recognition by the first recognition model, and then whether the result conforms to the first preset condition is decided according to the result of the first step recognition, that is, whether the recognition is to be continued is decided, and only when the preset condition is satisfied, a next step recognition is carried out by the second recognition model to obtain a recognition result, and a corresponding control instruction is executed according to the recognition result. Thus, since with the filtering of the first step recognition, only the one that conforms to the condition is recognized continually, so the proportion of the recognition result obtained finally being a valid recognition result is increased, that is, recognition rate is increased, and the voice information intercepted by the first step does not need to be carried out recognizing operation continually, so recognizing efficiency is increased.

Further, in the first embodiment of the present invention, the voice information that does not conform to the preset condition is discarded directly without being carried out a subsequent processing, so the unnecessary calculating amount is reduced significantly, and the electric power is saved since the second recognition model does not need to calculate.

Still further, in the first embodiment of the present invention, before recognizing by the first recognition model, a deciding condition is further set to decide whether the voice information itself conforms to a second preset condition directly, and when it does not conform to the second preset condition, the first voice information is discarded directly without being recognized by the first recognition model, so the electric power is further saved, and the calculating amount is further reduced.

Still further, in the first embodiment of the present invention, the second recognition result being obtained finally by the first recognition model and the second recognition model is only for determining whether the control instruction corresponding to the second recognition result is the wakening instruction, when it is the wakening instruction, the voice recognition service is wakened to let the voice recognition service execute the subsequent voice comment to carry out a recognition, and if it is not the wakening instruction, it is monitored continuously until the wakening instruction is detected, thus, the actual voice recognition service is in an inactive status all through, so the electric power and calculating amount is saved significantly.

As explained in the above, with the continuous development of the electronic apparatus, the control modes corresponding thereto are more and more, for example, they may be voice control, mouse control, touch control screen control or the like. Wherein, voice control mode gets more and more reception of users due to convenience and rapid of operation.

In the prior arts, the electronic apparatus usually includes a voice recognition engine, for example, the processing chip for voice recognition in the above first embodiment, wherein, the voice recognition engine includes various voice recognition models for recognizing the voice information input by the user, so that corresponding voice instruction or other voice information can be obtained by recognizing the voice information input by the user with the voice recognition engine.

In the prior arts, there are usually the following two kinds of voice recognition engines:

The first kind is voice recognition engine based on hardware, this recognition engine can recognize voice information without system operation, but its word library is limited due to the hardware technique, so that the recognizable voice information is relatively small;

The second kind is voice recognition engine based on software, the word amount in word library of this recognize engine is abundant, so a lot of voice information can be recognized, but system of the electronic apparatus needs to be initiated firstly to carry out recognition.

The inventor of this application found at least the following technical problems in the prior arts in the procedure of implementing the technical solution of the embodiment of this application:

In the prior arts, if the first kind of solution is adopted to carry out voice recognition, since the word library is limited, the voice recognition is not accurate enough; and if the second kind of solution is adopted to carry out voice recognition, since system of the electronic apparatus needs to be initiated, the power consumption is higher, so there is technical problem of reducing power consumption while ensuring accuracy rate of recognition in the prior art.

Therefore, the embodiments of the present invention further provide an information processing method and electronic apparatus for solving the technical problem of being incapable of reducing the power consumption while ensuring the accuracy rate of recognition in the prior arts.

In an aspect, one embodiment of this application provides the following technical solution:

An information processing method applied in an electronic apparatus, which includes at least two different voice recognition modules, the method including:

Obtaining first voice information to be recognized;

Obtaining that the current mode of the electronic apparatus is a first usage mode;

Determining that the voice recognition module corresponding to the first usage mode is a first voice recognition module in the at least two different voice recognition modules based on correspondence relationship between the usage mode and the voice recognition module;

Recognizing the voice information to be recognized by the first voice recognition module to obtain a recognition result.

Optionally, before obtaining that the current mode of the electronic apparatus is the first usage mode, the method further includes:

Detecting to obtain second voice information to be recognized when the electronic apparatus is in a second usage mode;

Recognizing the second voice information to be recognized by a second voice recognition module in the at least two different voice recognition modules corresponding to the second usage mode, to determine whether there is a first control instruction for controlling the electronic apparatus to enter the first usage mode;

Controlling the electronic apparatus to enter the first usage mode when there is the first control instruction.

Optionally, after determining whether there is the first control instruction for controlling the electronic apparatus to enter the first usage mode, the method further includes:

Recording first voice information input by the user between a first moment of generating the first control instruction and a second moment of switching to the first usage mode when there is the first control instruction.

Optionally, after recording the first voice information input by the user when the electronic apparatus is switched to the first usage mode from the second usage mode, the method further includes:

Storing the first voice information in a memory of the electronic apparatus.

Preferably, the obtaining the first voice information to be recognized specifically includes:

Reading the first voice information from the memory;

Acquiring first sub-voice information that have not been carried out voice recognition by the second voice recognition module in the first voice information, the first sub-voice information being the first voice information to be recognized.

Optionally, after controlling the electronic apparatus to enter the first usage mode, the method further includes:

Deciding whether there is a second control instruction for enabling the first voice recognition module;

Executing a step of determining the voice recognition module corresponding to the first usage mode as the first voice recognition module based on the correspondence relationship between the usage mode and the voice recognition module after deciding there is the second control instruction.

Optionally, after determining the voice recognition module corresponding to the first usage mode as the first voice recognition module, the method further includes:

Disabling the second voice recognition module.

Optionally, the first voice recognition module is a software voice recognition module or a hardware voice recognition module; the second voice recognition module is a hardware voice recognition module;

The first usage mode is a usage mode corresponding to the ON status; the second usage mode is an OFF/STANDBY mode.

Optionally, determining the voice recognition module corresponding to the first usage mode as the first voice recognition module based on the correspondence relationship between the usage mode and the voice recognition module specifically is:

Determining the voice recognition module corresponding to the first usage mode is a software voice recognition module based on the correspondence relationship between the usage mode and the voice recognition module when the first usage mode is a usage mode whose power consumption is larger than a first preset threshold;

Determining the voice recognition module corresponding to the first usage mode is a hardware voice recognition module when the first usage mode is a usage mode whose power consumption is less than the first preset threshold.

In another aspect, another embodiment of this application provides the following technical solution:

An information processing method applied in an electronic apparatus, the method including:

Detecting to obtain second voice information to be recognized when the electronic apparatus is in a second usage mode, wherein, the second usage mode is a corresponding usage mode when the electronic apparatus is in a power saving status;

Carrying out voice recognition to the second voice information to be recognized by a second voice recognition module corresponding to the second usage mode, to determine whether there is a first control instruction for controlling the electronic apparatus to enter the first usage mode;

Controlling the electronic apparatus to enter the first usage mode when there is the first control instruction, wherein, the first usage mode is a corresponding usage mode when the electronic apparatus is in a normal working status.

Optionally, after controlling the electronic apparatus to enter the first usage mode, the method further includes:

Determining the first voice recognition module corresponding to the first usage mode;

Acquiring first voice information to be recognized;

Carrying out recognition to the first voice information to be recognized based on the first voice recognition module to obtain at least a recognition result.

Optionally, after determining whether there is the first control instruction for controlling the electronic apparatus to enter the first usage mode, the method further includes:

Recording first voice information input by the user between a first moment of generating the first control instruction and a second moment of switching to the first usage mode when there is the first control instruction.

Optionally, acquiring the first voice information to be recognized specifically is:

Acquiring first sub-voice information that has not been carried out voice recognition by the second voice recognition module in the first voice information, the first sub-voice information being the first voice information to be recognized.

In another aspect, yet another embodiment of this application provides the following technical solution:

An electronic apparatus, which includes at least two different voice recognition modules, the electronic apparatus further includes:

A first obtaining chip for obtaining first voice information to be recognized;

A second obtaining chip for obtaining that the current mode of the electronic apparatus is a first usage mode;

A first determining chip for determining that the voice recognition module corresponding to the first usage mode is the first voice recognition module in the at least two different voice recognition modules based on the correspondence relationship between the usage mode and the voice recognition module;

A third obtaining chip for obtaining a recognition result by recognizing the voice information to be recognized by the first voice recognition module.

Optionally, the electronic apparatus further includes:

A first detecting chip for detecting whether there is a first control instruction for controlling the electronic apparatus to enter the first usage mode by the second voice recognition module corresponding to the second usage mode in the at least two different voice recognition modules when the electronic apparatus is in the second usage mode before obtaining that the current mode of the electronic apparatus is the first usage mode;

A first control chip for controlling the electronic apparatus to enter the first usage mode when there is the first control instruction.

Optionally, the electronic apparatus further includes:

A first recording chip for recording the first voice information input by the user between a first moment of generating the first control instruction and a second moment of switching to the first usage mode when there is the first control instruction after determining whether there is the first control instruction for controlling the electronic apparatus to enter the first usage mode.

Optionally, the electronic apparatus further includes:

A storage chip for storing the first voice information in a memory of the electronic apparatus after recording the first voice information input by the user when the electronic apparatus is switched to the first usage mode from the second usage mode.

Optionally, the first obtaining chip specifically includes:

A reading sub-chip for reading the first voice information from the memory;

An acquiring sub-chip for acquiring first sub-voice information that has not been carried out voice recognition by the second voice recognition module in the first voice information, the first voice information being the first voice information to be recognized.

Optionally, the electronic apparatus further includes:

A deciding chip for deciding whether there is a second control instruction for enabling the first voice recognition module after controlling the electronic apparatus to enter the first usage mode; and Executing a step of determining the voice recognition module corresponding to the first usage mode as the first voice recognition module based on the correspondence relationship between the usage mode and the voice recognition module after deciding there is the second control instruction.

Optionally, the electronic apparatus further includes:

A disabling chip for disabling the second voice recognition module after determining the voice recognition module corresponding to the first usage mode as the first voice recognition module.

Optionally, the first voice recognition module is a software voice recognition module or a hardware voice recognition module; the second voice recognition module is a hardware voice recognition module;

The first usage mode is a usage mode corresponding to the ON status; the second usage mode is an OFF/STANDBY mode.

Optionally, the first determining chip specifically includes:

A first determining sub-chip for determining that the voice recognition module corresponding to the first usage mode is a software voice recognition module based on the correspondence relationship between the usage mode and the voice recognition module when the first usage mode is a usage mode whose power consumption is larger than a first preset threshold;

A second determining sub-chip for determining that the voice recognition module corresponding to the first usage mode is a hardware voice recognition module when the first usage mode is a usage mode whose power consumption is less than the first preset threshold.

In another aspect, yet another embodiment of this application provides the following technical solution:

An electronic apparatus,

The electronic apparatus includes:

A second detecting chip for detecting to obtain second voice information to be recognized when the electronic apparatus is in a second usage mode, wherein, the second usage mode is a corresponding usage mode when the electronic apparatus is in a power saving status;

A second determining chip for determining whether there is a first control instruction for controlling the electronic apparatus to enter the first usage mode by carrying out voice recognition to the second voice information to be recognized by the second voice recognition module corresponding to the second usage mode;

A second control chip for controlling the electronic apparatus to enter the first usage mode when there is the first control instruction, wherein, the first usage mode is a corresponding usage mode when the electronic apparatus is in a normal working status.

Optionally, the electronic apparatus further includes:

A third determining chip for determining the first voice recognition module corresponding to the first usage mode after controlling the electronic apparatus to enter the first usage mode;

An acquiring chip for acquiring first voice information to be recognized;

A fourth obtaining chip for recognizing the first voice information to be recognized by the first voice recognition module to obtain at least a recognition result.

Optionally, the electronic apparatus further includes:

A second recording chip for recording the first voice information input by the user between a first moment of generating the first control instruction and a second moment of switching to the first usage mode when there is the first control instruction after determining whether there is the first control instruction for controlling the electronic apparatus to enter the first usage mode.

Optionally, the acquiring chip is specifically for:

Acquiring first sub-voice information that has not been carried out voice recognition by the second voice recognition module in the first voice information, the first sub-voice information being the first voice information to be recognized.

The one or more technical solutions provided in the above embodiments of this application at least have the following technical effects or advantages:

(1) Since the electronic apparatus are provided with at least two different voice recognition modules so that technical solutions of different voice recognition modules can be adopted based on different usage modes of the electronic apparatus in the embodiment of this application, when the electronic apparatus is in a usage mode of less control instruction, a voice recognition system with lower power consumption can be adopted, only when the electronic apparatus is in a usage mode of more control instruction, voice recognition system with higher power consumption is adopted, so that the technical problem of being incapable of reducing power consumption while increasing accuracy rate of recognition in the prior arts is solved, and technical effect of ensuring accuracy rate of recognition while reducing power consumption is achieved.

(2) In the embodiment of this application, when the electronic apparatus is in the second usage mode, for example, OFF/STANDBY mode, the control instruction is recognized by the second voice recognition module, for example, a hardware voice recognition module, to control the electronic apparatus to enter the first usage mode, since the hardware voice recognition module can implement voice recognition without enabling the electronic apparatus, the technical effect of saving power consumption is achieved.

(3) Since in the embodiment of this application, at the time of controlling the electronic apparatus to enter the first usage mode, the first voice information input by the user is recorded, thus, when the electronic apparatus adopts a first voice recognition system for example the software voice recognition module, the first voice information can be invoked by the software voice recognition module to be recognized, and the software voice recognition module has a larger vocabulary in comparison to the hardware voice recognition module, so that the technical effect of increasing accuracy rate of recognition is achieved.

(4) Since in the embodiment of this application, after controlling the electronic apparatus to enter the first usage mode, whether there is a second control instruction for enabling the first voice recognition module is decided firstly, and the first voice recognition module is enabled only when there is the second control instruction, the technical effect of saving power consumption is achieved.

(5) Since in the embodiment of this application, while enabling the first voice recognition module, the second voice recognition module is disabled, the technical effect of further reducing power consumption is achieved.

As explained in the above, the embodiments of the present invention provide an information processing method and electronic apparatus for solving the technical problem of being incapable of ensuring the accuracy rate of recognition while reducing the power consumption in the prior arts.

When voice information to be recognized is recognized, the current mode of the electronic apparatus is determined firstly, for example, the usage mode whose power consumption is larger than a first preset threshold, a usage mode whose power consumption is less than the first preset threshold or the like; then different voice recognition modules are determined based on difference of the current modes, for example, when the first usage mode is a usage mode whose power consumption is larger than the first preset threshold, the voice recognition module corresponding to the first usage mode is determined as a software voice recognition module, in this case, it represents the electronic apparatus is in a normal working status, and the voice instruction of the user thereof is relatively much, so recognition is carried out by using the software voice recognition module to increase accuracy rate of recognition; when the first usage mode is a usage mode whose power consumption is less than the first preset threshold, the voice recognition module corresponding to the first usage mode is determined as a hardware voice recognition module, in this case, the electronic apparatus may be in a STANDBY/SLEEP mode or the like, and in this case, the electronic apparatus only needs to execute some wakening instruction, thus, the word corresponding thereto needs not to be too much, so recognition is carried out by using the hardware voice recognition module to save power consumption.

Since when the electronic apparatus is in a usage mode of less control instruction when voice is recognized by the above-described solution, a voice recognition system with less power consumption can be adopted, only when the electronic apparatus is in a usage mode of more control instruction, the voice recognition system with higher power consumption is adopted, so the technical effect of reducing power consumption in case of ensuring the accuracy rate of recognition is achieved.

The Second Embodiment

The second embodiment of this application provides an information processing method applied in an electronic apparatus, which for example is a notebook computer, a mobile phone, a tablet computer or the like.

The electronic apparatus includes at least two different voice recognition systems, wherein, the at least two different voice recognition systems are for example a hardware voice recognition module and a software voice recognition module, or the at least two different voice recognition systems are a small vocabulary voice recognition system and a large vocabulary voice recognition system or the like, as for that the at least two different voice recognition system specifically is which kinds of voice recognition systems, the embodiment of this application does not make any limitation thereto.

Figure 3:
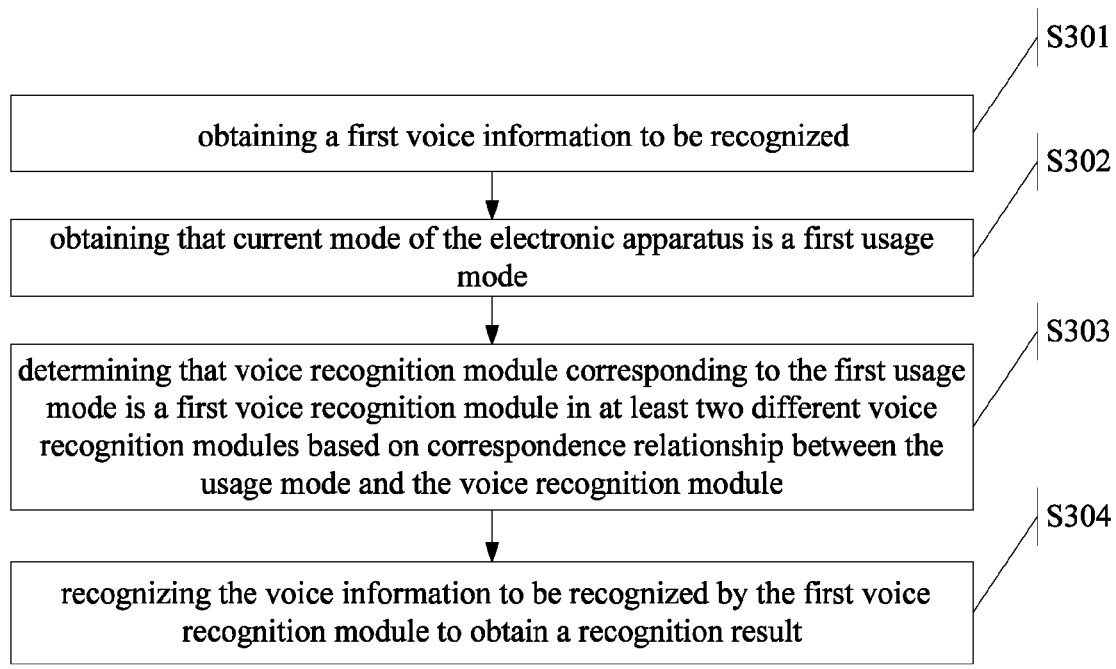
FIG. 3 is a flow chart of the voice recognition method of the second embodiment of this application.

With reference to FIG. 3, the information processing method includes the following steps:

Step S301: obtaining first voice information to be recognized;

Step S302: obtaining that the current mode of the electronic apparatus is a first usage mode;

Step S303: determining that voice recognition module corresponding to the first usage mode is a first voice recognition module in at least two different voice recognition modules based on correspondence relationship between the usage mode and the voice recognition module;

Step S304: recognizing the voice information to be recognized by the first voice recognition module to obtain a recognition result.

Figure 4:
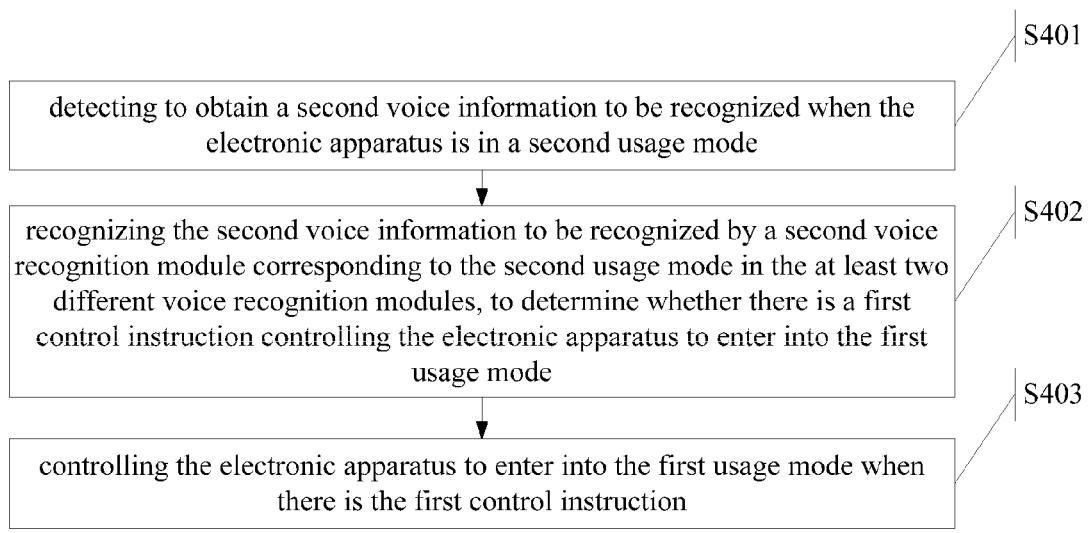
FIG. 4 is a flow chart of controlling the electronic apparatus to enter first usage mode in the method of the second embodiment of this application.

In the specific implementation procedure, before obtaining the voice information to be recognized based on step S301 or obtaining that the current mode of the electronic apparatus is the first usage mode based on step S302, as shown in FIG. 4, the method further includes the following steps:

Step S401: detecting to obtain second voice information to be recognized when the electronic apparatus is in a second usage mode;

Step S402: recognizing the second voice information to be recognized by a second voice recognition module corresponding to the second usage mode in the at least two different voice recognition modules, to determine whether there is a first control instruction controlling the electronic apparatus to enter the first usage mode;

Step S403: controlling the electronic apparatus to enter the first usage mode when there is the first control instruction.

In the specific implementation procedure, the second usage mode in step S401 is for example an OFF mode, a STANDBY mode, in this case, the second voice recognition module is for example a hardware voice recognition module, wherein, when the electronic apparatus is in an OFF mode or a STANDBY mode, the hardware voice recognition module and microphone in the electronic apparatus are still in a working status, voice information input by the user is collected by the microphone and stored in a memory of the electronic apparatus.

In usual cases, different voice recognition modules of the electronic apparatus can share a microphone, that is, in despite of the electronic apparatus adopting which kinds of voice recognition module, voice information can be collected by using the same microphone, and a buffer of the microphone can be shared, that is, when the electronic apparatus adopts the second voice recognition module, the storage location of the collected voice information thereof is the same as the storage location of the collected voice information thereof when the electronic apparatus adopts the first voice recognition module.

After obtaining the second voice information to be recognized based on step S401, the second voice information to be recognized is recognized based on step S402, i.e., by the second voice recognition module, so as to obtain some simple control instructions, for example, an enabling instruction, a wakening instruction or the like.

Thus, after the microphone of the electronic apparatus detects the voice information, the voice information is recognized by a hardware voice recognition engine, to determine whether there is voice information related to enabling or wakening, where there is related voice information, an enabling instruction or a wakening instruction is generated, to control the electronic apparatus to enter the first usage mode, for example, a usage mode corresponding to an ON status, such as a normal usage mode, a power saving usage mode or the like.

It is understood from the above description that, since in the embodiment of this application, when the electronic apparatus is in the second usage mode, for example, an OFF/Standby mode, the voice information is recognized by the second voice recognition module, for example, a hardware voice recognition module, to control the electronic apparatus to enter the first usage mode, since the hardware voice recognition module can implement voice recognition without enabling the electronic apparatus, the technical effect of saving power consumption is achieved.

After determining whether there is the first control instruction for controlling the electronic apparatus to enter the first usage mode based on step S402, the method further includes:

Recording first voice information input by the user between a first moment of generating the first control instruction and a second moment of switching to the first usage mode when there is the first control instruction.

In the specific implementation procedure, after the user controls the electronic apparatus to switch to the first usage mode from the second usage mode with voice information, the user usually wants the electronic apparatus to execute some operations, for example, opening a text editor, opening a music player, opening a webpage browser or the like.

Thus, after controlling to enable with the voice information, the user may further generate some other voice information, for example, "opening a text editor", "opening a music player", "opening a webpage browser" or the like, wherein, since the vocabulary included in the second voice recognition system for example the hardware voice recognition module is relatively small, maybe only a vocabulary for controlling to enable or waken is included, but the above vocabulary generated by the user can not be recognized, thus, when the hardware voice recognition module detects the enabling instruction/wakening instruction, it can record the first voice information input by the user.

In the specific implementation procedure, after acquiring the first voice information, the first voice information can be stored in a memory of the electronic apparatus, of course, it can be stored at other positions, as for storing in which kinds of storage device, the embodiment of this application does not make any limitation thereto.

It is understood from the above description that, since in the embodiment of this application, when there is the first control instruction for controlling the electronic apparatus to enter the first usage mode, the first voice information input by the user is recorded, thus, when the electronic apparatus adopts a first voice recognition system for example the software voice recognition module, the first voice information can be invoked by the software voice recognition module to be recognized, and the software voice recognition module has a larger vocabulary in comparison to the hardware voice recognition module, so that the technical effect of increasing accuracy rate of recognition is achieved.

Wherein, in step S301, obtaining first voice information to be recognized may be divided into a plurality of cases, two kinds among others are enumerated to be described, of course, in the specific implementation procedure, it is not limited to the following two kinds of cases.

The first kind specifically includes the following steps:

Reading the first voice information from the memory;

Acquiring first sub-voice information that has not been carried out voice recognition by the second voice recognition module in the first voice information, the first sub-voice information being the first voice information to be recognized.

In the specific implementation procedure, since when the electronic apparatus is controlled to switch to the first usage mode from the second usage mode, the voice information of the user has been already recorded and stored in the memory, thus, the first voice information can be read from the memory directly as the voice information to be recognized. Wherein, when the first voice information is stored in the memory, the end time point of voice information of recognizing the first voice information by the second voice recognition module is recorded, and the voice information after this time point is the first sub-voice information that has not been recognized by the second voice recognition module.

The second kind, acquiring the voice information of the user directly by microphone in real time.

In the specific implementation procedure, the first voice information may not be the voice information of the user for controlling the electronic apparatus, or the first voice information is not recorded, so the voice information can be captured directly by the microphone in real time to control the electronic apparatus.

Wherein, after the electronic apparatus enters the first usage mode, the electronic apparatus can generate prompt information for prompting that there is no voice information for controlling the electronic apparatus at present and whether the voice information of the user is needed to be recorded is determined.

For example, the following prompt information is generated:

"there is no voice information for controlling the electronic apparatus at present, please input corresponding voice information to control the electronic apparatus."

Of course, in the specific implementation procedure, the prompt information is not limited to the above-described prompt information, as for the prompt information is which kinds of prompt information, the embodiment of this application does not make any limitation thereto.

Wherein, in step S302, several ways can be adopted to determine the current first usage mode of the electronic apparatus, two ways among others are enumerated to be described as follows, of course, in the specific implementation procedure, it is not limited to the following two kinds of cases.

The first kind, determining the power consumption of the electronic apparatus, for example, if the power consumption of the electronic apparatus is less than a preset threshold, then it is determined that the usage mode of the electronic apparatus is a power saving usage mode; and if the power consumption of the electronic apparatus is larger than a preset threshold, then it is determined that the usage mode of the electronic apparatus is a normal usage mode, and so on.

The second kind, determining applications being in a running status in the electronic apparatus, for example, if the application is simple game application, image processing program, then it determines that the control thereof needs less word for controlling, thus it can determine that it is small vocabulary usage mode; and when the application is complicate image processing program, text editing program, it determines that the control thereof needs more word for controlling, thus it determines that it is large vocabulary usage mode, and so on.

In the specific implementation procedure, a correspondence relationship table of applications and voice recognition systems can be provided in the electronic apparatus, and the voice recognition system corresponding to the application is determined based on the correspondence relationship table; or, the electronic apparatus detects vocabulary used by the application directly, and determines different voice recognition systems corresponding to different applications based on different vocabularies.

Figure 5:
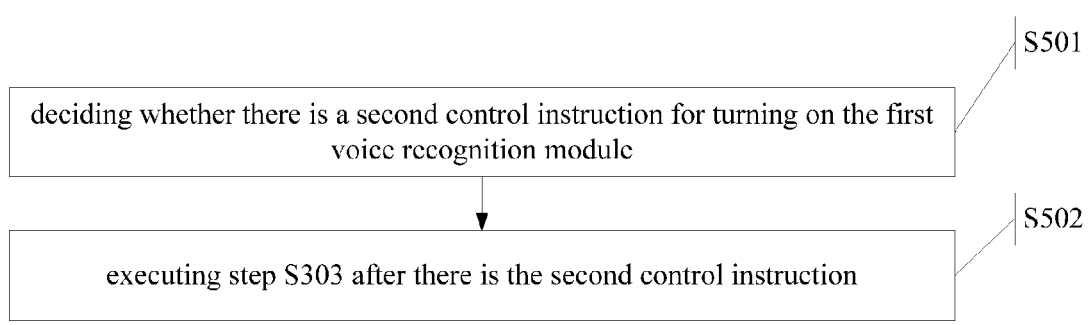
FIG. 5 is a flow chart of deciding whether the first voice recognition module is enabled in the method of the second embodiment of this application.

In the specific implementation procedure, after controlling the electronic apparatus to enter the first usage mode based on step S102, as shown in FIG. 5, the method further includes the following steps:

Step S501: deciding whether there is a second control instruction for enabling the first voice recognition module;

Step S502: executing step S303 after deciding there is the second control instruction.

In the specific implementation procedure, the above-described second control instruction can be obtained by an arbitrary manner, for example, when the second voice recognition system is in an ON status, user's voice information is captured and analysed by the second voice recognition system, when speech analysis result for controlling the first voice recognition module is included in the voice information is determined, step S303 is executed; or, the second control instruction can be triggered by a manner of responding to the user clicking a certain button; or, the second control instruction can be triggered by responding to a slide operation of the user on the touch control screen, and so on. As for which manner is adopted to trigger the second control instruction in the specific implementation procedure, the embodiment of this application does not make any limitation thereto.

It is understood from the above description that, since in the embodiment of this application, after controlling the electronic apparatus to enter the first usage mode, whether there is a second control instruction for enabling the first voice recognition module is decided firstly, and the first voice recognition module is enabled only when there is the second control instruction, the technical effect of saving power consumption is achieved.

Wherein, in step S303, determining that the voice recognition module corresponding to the first usage mode is the first voice recognition module based on the correspondence relationship between the usage mode and the voice recognition module specifically includes:

Determining the voice recognition module corresponding to the first usage mode is a software voice recognition module based on the correspondence relationship between the usage mode and the voice recognition module when the first usage mode is a usage mode whose power consumption is larger than a first preset threshold;

Determining the voice recognition module corresponding to the first usage mode as a hardware voice recognition module when the first usage mode is a usage mode whose power consumption is less than the first preset threshold.

In the specific implementation procedure, after the electronic apparatus enters the first usage mode, for example, the usage mode corresponding to the ON status, wherein, different voice recognition systems may be corresponded based on different from usage modes corresponding to ON status, it is assumed that there is the following correspondence relationship table:

| The first usage mode | Voice recognition system |
| --- | --- |
| Power saving usage mode | Hardware voice recognition module/small vocabulary software voice recognition module |
| Normal usage mode | Software voice recognition module/large vocabulary software voice recognition module |

Wherein, since the electronic apparatus adopts the power saving usage mode, thus it is clear that the user wishes to save power consumption, so the voice recognition module with a smaller vocabulary, for example, a hardware voice recognition module or a small vocabulary software voice recognition module is adopted, thus power consumption is saved; and when the electronic apparatus adopts a normal working mode, the uses wishes the recognition is more precise, so the voice recognition module with a larger vocabulary, for example, the software voice recognition module opposite to the hardware voice recognition module, or the large vocabulary software voice recognition module opposite to the small vocabulary software voice recognition module is adopted.

Further, in the specific implementation procedure, the corresponding first voice recognition system can be also determined based on difference of the applications used by the electronic apparatus.

For example, when the application used by the electronic apparatus is a relatively simple application, that is, when the usage mode of the electronic apparatus is a small vocabulary usage mode, the control instruction corresponding thereto is less and relatively simple, for example, the first application is a picture viewer, and the control instruction corresponding thereto is less, such as "previous", "next", "zoom-in", "zoom-out" or the like, and in this case, the hardware voice recognition module or the small vocabulary voice recognition module is adopted.

When the first application is a relatively complicate application, for example, a text input application, an image processing application or the like, since the control instruction corresponding thereto is more, that is, when the usage mode of the electronic apparatus is a large vocabulary usage mode, the voice recognition module with a larger vocabulary, for example, the software voice recognition module opposite to the hardware voice recognition module, or the large vocabulary software voice recognition module opposite to small vocabulary software voice recognition module or the like is adopted, to achieve a more accurate recognition.

In the specific implementation procedure, the executing order of step S301 and step S302, step S303 does not have a precedence order, and step S301 may be executed firstly, or step S302 and step S303 are executed firstly, or step S301 and step S302, step S303 are executed at the same time, the embodiment of this application does not make any limitation thereto.

In the specific implementation procedure, after determining that the voice recognition module corresponding to the first usage mode is the first voice recognition module based on step S303, the method further includes:

Disabling the second voice recognition module.

In the specific implementation procedure, if the first voice recognition system is the software voice recognition module is determined in step S303, since the recognized accuracy thereof is higher, assistance of the second voice recognition module, i.e., the hardware voice recognition module, to implement accurate recognition is not needed, so in this case, the second voice recognition module is disabled.

It is understood from the above description that, since in the embodiment of this application, while enabling the first voice recognition module, the second voice recognition module is disabled, the technical effect of further reducing power consumption is achieved.

In step S304, when the voice information to be recognized is recognized by the first voice recognition module, several kinds of recognition results may be obtained, the recognition result is for example a control instruction of applications, such as, opening a PS image processing software, opening a music player, or an operation to document, such as opening a file folder in disk C, opening a word document named "application document" on desktop or the like; or some setting of the electronic apparatus, such as closing a volume control button, replacing wallpaper of desktop or the like, as for which result the recognition result is, the embodiment of this application does not make any limitation thereto.

The Third Embodiment

In order for those skilled in the art to understand the specific implementation procedure of the information processing method described in the first embodiment of this application, in the present embodiment, the specific implementation procedure of the information processing method is described in detail from the user side.

In the present embodiment, description is provided by taking the electronic apparatus as a notebook computer, the first voice recognition module as the hardware voice recognition module or the software voice recognition module, and the second voice recognition module as the hardware voice recognition module as example.

At moment T1, the notebook computer is in an OFF status, wherein, the microphone and hardware voice recognition system of the notebook computer are in an ON status.

At moment T2, the user A wishes to enable the notebook computer to carry out some image processing, thus, the user A generates the voice information "enabling";

After the processor of the notebook computer detects the above-described voice information of the user and recognizes it, an enabling control instruction is obtained, to control the notebook computer to enter an ON status; the processor of the notebook computer begins to record voice information of the user A at the same time, wherein, when the following first voice information "opening beautiful figure shows and opening jpg file named 'bright moon at Ch'in time' stored on desktop" is recorded, and the first voice information is stored in the memory.

At moment T3, the notebook computer enters an ON status, and since the user of the notebook computer has not set the working mode thereof yet, the working mode thereof is a normal usage mode, and after the notebook computer determines that the first usage mode is the normal usage mode, the software voice recognition system is enabled, and the hardware voice recognition system is disabled at the same time.

At the same time, the notebook computer recognizes the first voice information to obtain the following voice control instruction:

"opening beautiful figure shows", "opening bright moon at Ch' in time.jpg".

Thus, the processor of the notebook computer controls the program of beautiful figure shows to be in an ON status, and after the program of beautiful figure shows is controlled to be in an ON status, the bright moon at Ch' in time.jpg is opened in the program of beautiful figure shows.

The Fourth Embodiment

The present embodiment will describe by taking the electronic apparatus as a tablet computer and the first voice recognition system as a small vocabulary software voice recognition system or a large vocabulary software voice recognition system as example.

At moment T4, the user B uses the tablet computer to play game of Russia square, wherein, the game of Russia square only includes four control instructions of "left", "right", "accelerate", "rotate";

After the processor of the tablet computer determines that the application running on the tablet computer is Russia square, it determines that the tablet computer is in a small vocabulary usage mode, thus the small vocabulary software voice recognition system of the tablet computer is enabled to recognize the control instruction of the user.

At moment T5, the user B closes game of Russia square, and opens WORD application to start to input document, after the tablet computer detects that the user opens WORD document, it determines that the control instruction thereof is relatively more, so it determines that there is a large vocabulary usage mode, thus, a large vocabulary software voice recognition system of the tablet computer is enabled to recognize the voice information of the user B.

The Fifth Embodiment

Based on the same inventive concept, the fifth embodiment of this application provides an information processing method applied in an electronic apparatus, which is for example a tablet computer, a mobile phone, a notebook computer or the like.

Figure 6:
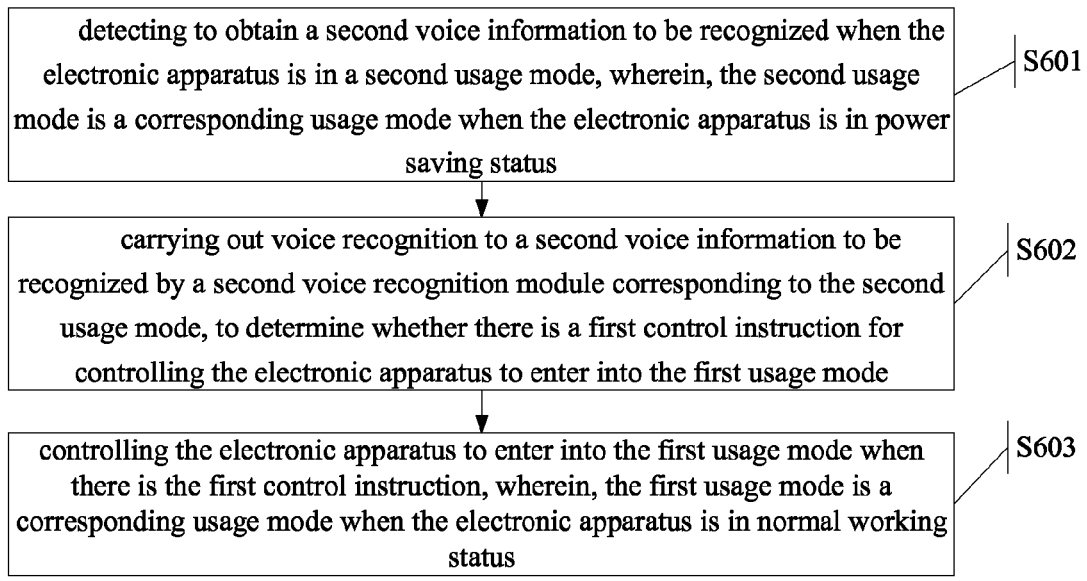
FIG. 6 is a flow chart of the information processing method of the fifth embodiment of this application.

With reference to FIG. 6, the information processing method includes the following steps:

Step S601: detecting to obtain second voice information to be recognized when the electronic apparatus is in a second usage mode, wherein, the second usage mode is a corresponding usage mode when the electronic apparatus is in a power saving status;

Step S602: carrying out voice recognition to the second voice information to be recognized by a second voice recognition module corresponding to the second usage mode, to determine whether there is a first control instruction for controlling the electronic apparatus to enter the first usage mode;

Step S603: controlling the electronic apparatus to enter the first usage mode when there is the first control instruction, wherein, the first usage mode is a corresponding usage mode when the electronic apparatus is in a normal working status.

Wherein, in step S601, the second usage mode can be any usage mode corresponding to when the electronic apparatus is in a power saving status, for example, an OFF mode, a STANDBY mode, a SLEEP mode or the like, the embodiment of this application does not make any limitation thereto.

In this case, the microphone of the electronic apparatus is still in a working status, and capable of recording voice information generated by the user in real time.

Wherein, in step S602, the second voice recognition module is for example the hardware voice recognition module, when the electronic apparatus is in an OFF mode, a STANDBY mode or a SLEEP mode, the hardware voice recognition module is still in a working status, and the second voice information acquired by the microphone can be recognized by the hardware voice recognition module, so as to obtain some simple control instruction, for example, a enabling instruction, a wakening instruction or the like.

Wherein, in step S603, the first usage mode is any usage mode corresponding to when the electronic apparatus is in a normal working status.

Figure 7:
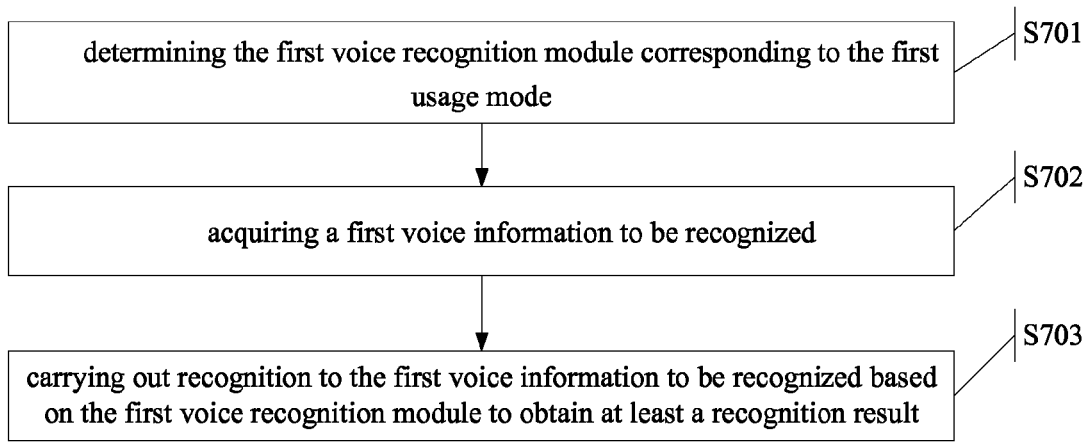
FIG. 7 is a flow chart of processing after entering the first usage mode in the method of the fifth embodiment of this application.

In the specific implementation procedure, after controlling the electronic apparatus to enter the first usage mode in step S603, with reference to FIG. 7, the method further includes the following steps:

S701: determining the first voice recognition module corresponding to the first usage mode;

S702: acquiring first voice information to be recognized;

S703: carrying out recognition to the first voice information to be recognized based on the first voice recognition module to obtain at least a recognition result.

Wherein, in step S701, since the first usage mode is a usage mode corresponding to the normal working status, the first voice recognition module is usually the software voice recognition module, of course, in the specific implementation procedure, the electronic apparatus can automatically enable the first voice recognition module after the electronic apparatus is switched to the first usage mode; or, a corresponding control instruction is generated after the operation of the user is received, to control the electronic apparatus to enable the first voice recognition module, as for the first voice recognition module is enabled in which kinds of occasions, the embodiment of this application does not make any limitation thereto.

In the specific implementation procedure, in step S702, the first voice information to be recognized can be obtained by adopting many kinds of ways, two kinds among others are enumerated hereinafter to be described.

The first kind, after determining whether there is the first control instruction for controlling the electronic apparatus to enter the first usage mode, the method further includes:

Recording first voice information input by the user between a first moment of generating the first control instruction and a second moment of switching to the first usage mode when there is the first control instruction.

In this case, acquiring the first voice information to be recognized specifically is:

Acquiring first sub-voice information that have not been carried out voice recognition by the second voice recognition module in the first voice information, the first sub-voice information is the first voice information to be recognized.

In the specific implementation procedure, after the microphone records the first voice information of the user, the first voice information can be stored in the memory of the electronic apparatus, and after the first voice recognition module is enabled, the first voice information can be read from the memory directly. Wherein, when the first voice information is stored in the memory, the end time point of voice information of recognizing the first voice information by the second voice recognition module is recorded, and the voice information after this time point is the first sub-voice information that have not been recognized by the second voice recognition module.

It is understood from the above description that, since in the embodiment of this application, when there is the first control instruction for controlling the electronic apparatus to enter the first usage mode, the first voice information input by the user is recorded, thus, when the electronic apparatus adopts a first voice recognition system for example the software voice recognition module, the first voice information can be invoked by the software voice recognition module to be recognized, and the software voice recognition module has a larger vocabulary in comparison to the hardware voice recognition module, so that the technical effect of increasing accuracy rate of recognition is achieved.

The second kind, after deciding there is the first control instruction, the first voice information is not recorded, thus, after the first voice recognition module is enabled, the voice information of the user is acquired by the microphone in real time.

In the specific implementing procedure, the first voice information may not be the voice information for controlling the electronic apparatus by the user, or the first voice information is not recorded, so the voice information captured directly by the microphone in real time can be the first voice information to be recognized.

Wherein, after the electronic apparatus enters the first usage mode, the electronic apparatus can generate prompt information for prompting that there is not voice information for controlling the electronic apparatus at present and whether the voice information of the user is needed to be recorded is determined.

The Sixth Embodiment

Based on the same inventive concept, the sixth embodiment of this application provides an electronic apparatus, the electronic apparatus is for example a notebook computer, a mobile phone, a tablet computer or the like.

The electronic apparatus includes at least two different voice recognition modules, in the specific implementation procedure, the at least two different voice recognition modules are for example the hardware voice recognition module and the software voice recognition module, or the at least two different voice recognition modules are small vocabulary voice recognition module and large vocabulary voice recognition module or the like, for the at least two different voice recognition module being specifically which kinds of voice recognition modules, the embodiment of this application does not make any limitation thereto.

Figure 8:
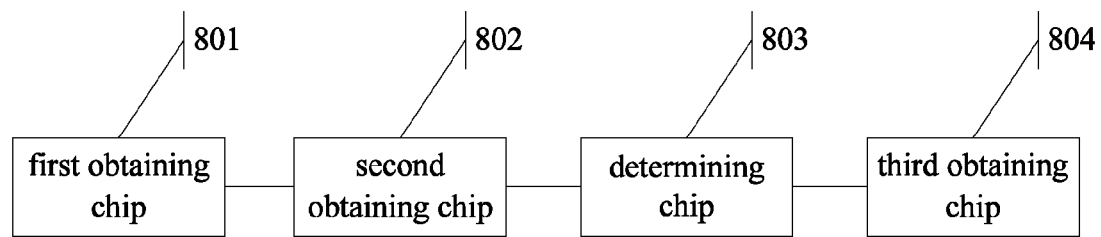
FIG. 8 is a structural diagram of the electronic apparatus of the sixth embodiment of this application.

With reference to FIG. 8, the electronic apparatus further includes the following structure:

A first obtaining chip 801 for obtaining first voice information to be recognized;

A second obtaining chip 802 for obtaining that the current mode of the electronic apparatus is a first usage mode;

A determining chip 803 for determining that the voice recognition module corresponding to the first usage mode is the first voice recognition module in the at least two different voice recognition modules based on the correspondence relationship between the usage mode and the voice recognition module;

A third obtaining chip 804 for obtaining a recognition result by recognizing the voice information to be recognized by the first voice recognition module.

In the specific implementation procedure, the electronic apparatus further includes the following structures:

A detecting chip for detecting whether there is a first control instruction for controlling the electronic apparatus to enter the first usage mode by the second voice recognition module corresponding to the second usage mode in the at least two different voice recognition modules when the electronic apparatus is in the second usage mode before obtaining that the current mode of the electronic apparatus is the first usage mode;

A control chip for controlling the electronic apparatus to enter the first usage mode when there is the first control instruction.

In the specific implementation procedure, the second usage mode is for example an OFF mode, a STANDBY mode or the like, in this case, the second voice recognition module is for example the hardware voice recognition module. Wherein, when the electronic apparatus is in an OFF mode or a STANDBY mode, the hardware voice recognition module and the microphone on the electronic apparatus are still in a working status, some simple voice information can be recognized by the hardware voice recognition module, to generate some simple control instruction, so that voice information of the user can be detected to determine whether the electronic apparatus is controlled to enter the first usage mode.

It is understood from the above description that, since in the embodiment of this application, when the electronic apparatus is in the second usage mode, for example, OFF/Standby mode, the control instruction is recognized by the second voice recognition module, for example, hardware voice recognition module, to control the electronic apparatus to enter the first usage mode, since the hardware voice recognition module can implement voice recognition without enabling the electronic apparatus, the technical effect of saving power consumption is achieved.

In the specific implementation procedure, the electronic apparatus further includes:

A recording chip for, after controlling the electronic apparatus to enter the first usage mode, recording the first voice information input by the user when the electronic apparatus is switched to the first usage mode from the second usage mode, the first voice information is the voice information to be recognized.

In the specific implementation procedure, the electronic apparatus further includes:

A storage chip for storing the first voice information in a memory of the electronic apparatus after recording the first voice information input by the user when the electronic apparatus is switched to the first usage mode from the second usage mode.

It is understood from the above description that, since in the embodiment of this application, when there is the first control instruction for controlling the electronic apparatus to enter the first usage mode, the first voice information input by the user is recorded, thus, when the electronic apparatus adopts a first voice recognition system for example the software voice recognition module, the first voice information can be invoked by the software voice recognition module to be recognized, and the software voice recognition module has a larger vocabulary in comparison to the hardware voice recognition module, so that the technical effect of increasing accuracy rate of recognition is achieved.

In the specific implementation procedure, the first obtaining chip 801 can obtain the first voice information by adopting several kinds of ways, two kinds among others are enumerated hereinafter to be described, of course, in the specific implementation procedure, it is not limited to the following two kinds of cases.

The first kind, the first obtaining chip 801 is specifically for:

Reading the first voice information from the memory;

The second kind, the second obtaining chip 801 is specifically for:

Acquiring voice information of the user by the microphone in real time.

In the specific implementation procedure, the electronic apparatus further includes:

A deciding chip for deciding whether there is a second control instruction for enabling the first voice recognition module after controlling the electronic apparatus to enter the first usage mode; and Executing a step of determining the voice recognition module corresponding to the first usage mode as the first voice recognition module based on the correspondence relationship between the usage mode and the voice recognition module after deciding there is the second control instruction.

It is understood from the above description that, since in the embodiment of this application, after controlling the electronic apparatus to enter the first usage mode, whether there is a second control instruction for enabling the first voice recognition module is decided firstly, and the first voice recognition module is enabled only when there is the second control instruction, the technical effect of saving power consumption is achieved.

In the specific implementation procedure, the determining chip 804 specifically includes:

A first determining sub-chip for determining that the voice recognition module corresponding to the first usage mode is a software voice recognition module based on the correspondence relationship between the usage mode and the voice recognition module when the first usage mode is a usage mode whose power consumption is larger than a first preset threshold;

A second determining sub-chip for determining that the voice recognition module corresponding to the first usage mode is a hardware voice recognition module when the first usage mode is a usage mode whose power consumption is less than the first preset threshold.

In the specific implementation procedure, the electronic apparatus further includes:

A disabling chip for disabling the second voice recognition module after determining the voice recognition module corresponding to the first usage mode as the first voice recognition module.

It is understood from the above description that, since in the embodiment of this application, while enabling the first voice recognition module, the second voice recognition module is disabled, the technical effect of further reducing power consumption is achieved.

Since the electronic apparatus described by the present embodiment is the electronic apparatus adopted by implementing the voice recognition method of the second to the fourth embodiments of this application, so based on the voice recognition method described in the second to the fourth embodiments of this application, those skilled in the art can understand the specific implementation mode and the various variations of the electronic apparatus in the sixth embodiment of this application, so the electronic apparatus is no longer described in detail here. The electronic apparatus adopted by those skilled in the art implementing the voice recognition method in the second to the fourth embodiments of this application all fall into the scope sought for protection in this application.

The Seventh Embodiment

Based on the same inventive concept, the seventh embodiment of this application provides an electronic apparatus, which is for example a notebook computer, a mobile phone, a tablet computer or the like.

Figure 9:
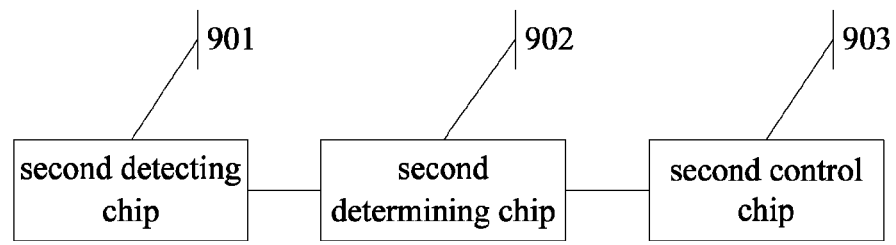
FIG. 9 is a structural diagram of the electronic apparatus of the seventh embodiment of this application.

With reference to FIG. 9, the electronic apparatus includes the following structure:

A second detecting chip 901 for detecting to obtain second voice information to be recognized when the electronic apparatus is in a second usage mode, wherein, the second usage mode is a corresponding usage mode when the electronic apparatus is in a power saving status;

A second determining chip 902 for determining whether there is a first control instruction for controlling the electronic apparatus to enter the first usage mode by carrying out voice recognition to the second voice information to be recognized by the second voice recognition module corresponding to the second usage mode;

A second control chip 903 for controlling the electronic apparatus to enter the first usage mode when there is the first control instruction, wherein, the first usage mode is a corresponding usage mode when the electronic apparatus is in a normal working status.

In the specific implementation procedure, the electronic apparatus further includes:

A third determining chip for determining the first voice recognition module corresponding to the first usage mode after controlling the electronic apparatus to enter the first usage mode;

An acquiring chip for acquiring first voice information to be recognized;

A fourth obtaining chip for recognizing the first voice information to be recognized by the first voice recognition module to obtain at least a recognition result.

In the specific implementation procedure, the acquiring chip can acquire the first voice information to be recognized by adopting several kinds of ways, two kinds among others are enumerated hereinafter to be described, of course, in the specific implementation procedure, it is not limited to the following two kinds of cases.

The first kind, the electronic apparatus further includes:

A second recording chip for recording the first voice information input by the user between a first moment of generating the first control instruction and a second moment of switching to the first usage mode when there is the first control instruction after determining whether there is the first control instruction for controlling the electronic apparatus to enter the first usage mode.

In this case, the acquiring chip is specifically for:

Acquiring first sub-voice information that has not been carried out voice recognition by the second voice recognition module in the first voice information, the first sub-voice information being the first voice information to be recognized.

It is understood from the above description that, since in the embodiment of this application, when there is the first control instruction for controlling the electronic apparatus to enter the first usage mode, the first voice information input by the user is recorded, thus, when the electronic apparatus adopts a first voice recognition system for example the software voice recognition module, the first voice information can be invoked by the software voice recognition module to be recognized, and the software voice recognition module has a larger vocabulary in comparison to the hardware voice recognition module, so that the technical effect of increasing accuracy rate of recognition is achieved.

The second kind, the acquiring chip is specifically for:

Capturing the voice information of the user by the microphone in real time as the first voice information to be recognized.

Since the electronic apparatus described by the present embodiment is the electronic apparatus adopted by implementing the voice recognition method of the fifth embodiment of this application, so based on the voice recognition method described in the fifth embodiment of this application, those skilled in the art can understand the specific implementation mode and the various variations of the electronic apparatus in the seventh embodiment of this application, so the electronic apparatus is no longer described in detail here. The electronic apparatus adopted by those skilled in the art implementing the information processing method in the fifth embodiment of this application all fall into the scope sought for protection in this application.

One or more technical solutions provided by the second to the seventh embodiments of this application at least have the following technical effects or advantages:

(1) Since the electronic apparatus are provided with at least two different voice recognition modules so that technical solutions of different voice recognition modules can be adopted based on different usage modes of the electronic apparatus in the embodiments of this application, when the electronic apparatus is in a usage mode of less control instruction, a voice recognition system with lower power consumption can be adopted, only when the electronic apparatus is in a usage mode of more control instruction, voice recognition system with higher power consumption is adopted, so that the technical problem of being incapable of reducing power consumption while increasing accuracy rate of recognition in the prior arts is solved, and technical effect of ensuring accuracy rate of recognition in case of reducing power consumption is achieved.

(2) In the embodiment of this application, when the electronic apparatus is in the second usage mode, for example, an OFF/STANDBY mode, the control instruction is recognized by the second voice recognition module, for example, a hardware voice recognition module, to control the electronic apparatus to enter the first usage mode, since the hardware voice recognition module can implement voice recognition without enabling the electronic apparatus, the technical effect of saving power consumption is achieved.

(3) Since in the embodiment of this application, when there is the first control instruction for controlling the electronic apparatus to enter the first usage mode, the first voice information input by the user is recorded, thus, when the electronic apparatus adopts a first voice recognition system for example the software voice recognition module, the first voice information can be invoked by the software voice recognition module to be recognized, and the software voice recognition module has a larger vocabulary in comparison to the hardware voice recognition module, so that the technical effect of increasing accuracy rate of recognition is achieved.

(4) Since in the embodiment of this application, after controlling the electronic apparatus to enter the first usage mode, whether there is a second control instruction for enabling the first voice recognition module is decided firstly, and the first voice recognition module is enabled only when there is the second control instruction, the technical effect of saving power consumption is achieved.

(5) Since in the embodiment of this application, while enabling the first voice recognition module, the second voice recognition module is disabled, the technical effect of further reducing power consumption is achieved.

As explained in the above, with the thorough development of multimedia communication and sound conversion technique, the acoustic control system gets wide attention, the acoustic control system has already come into practical application with long and fast development, a set of complete acoustic control system includes: sound recognition system, semanteme recognition system and control device. In the application, when there is sound information in environment, the acoustic control system is enabled, whether the voiceprint information characteristic of the acquired sound information is the same as the preset voiceprint information characteristic is decided by the sound recognition system, and if so, then the semanteme recognition is carried out and the semanteme is executed.

In actual operation, the sound information obtained by the acoustic control system is usually more than the sound information needs to be executed thereby, if each time when there is sound information (including voice information of the user and other sound information) in the environment, the acoustic control system is triggered to be enabled and carry out voice recognition, the power consumption of the IDLE status of the acoustic control system is high, and it will reduce stand-by time of the acoustic control system significantly.

In the prior arts, a voltage threshold is added in MIC input signal of the acoustic control system to be decided, an interrupt is generated as meeting a condition, and then the system is wakened to carry out collection of the sound information. However, the inventor of this application found that the above-described technology at least has the following technical problems in procedure of implementing the technical solution of the embodiment of this application:

When the acoustic control system is in an extremely noisy environment, the sound information satisfying the threshold voltage is still much, and in order to carry out voice recognition, the acoustic control system is triggered ceaselessly, which causes technical problems of extreme power consumption.

Also, the acoustic control system will consume electric power in the procedure of voice recognition, it causes the technical problem of undersupply when the acoustic control system carries out sound content recognition and generates instructions subsequently, which reduces stand-by time of the entire acoustic control system.

The eighth embodiment of this application is for solving the technical problem that the acoustic control system is triggered ceaselessly in order to carry out voice recognition so that it causes extreme power consumption in the prior arts by providing an information processing method and electronic apparatus.

In an aspect, the embodiment of this application provides an information processing method applied in an electronic apparatus, which includes a first processing unit whose power consumption is a first power consumption and a second processing unit connected to the first processing unit, wherein, the power consumption of the second processing unit is a second power consumption which is larger than the first power consumption, the method including:

When the second processing unit is in a disabled status, the first processing unit obtaining first sound information of a first user;

The first processing unit deciding whether the first sound information satisfies a first preset condition;

The first processing unit generating a trigger instruction and sending the trigger instruction to the second processing unit to make the second processing unit be in an enabled status when the first sound information satisfies the first preset condition;

The second processing unit obtaining second sound information of the first user;

The second processing unit generating a first acoustic control instruction corresponding to the second sound information based on correspondence relationship between the sound information and the acoustic control instruction.

Optionally, before the first processing unit obtaining the first sound information of the first user when the second processing unit is in the disabled status, the method further includes:

When the first processing unit is in the disabled status, obtaining an ON instruction, and executing the ON instruction to make the first processing unit be in the enabled status.

Optionally, when a first voiceprint information of the first user is included in the first sound information, the first processing unit deciding whether the first sound information satisfies the first preset condition specifically is:

The first processing unit deciding whether the first voiceprint information matches pre-stored standard voiceprint information of the first user.

Optionally, after the first processing unit deciding whether the first sound information satisfies the first preset condition, the method further includes:

When the first sound information does not satisfy the first preset condition, the first processing unit deleting the first sound information.

Optionally, the second processing unit obtaining the second sound information of the first user specifically is:

The second processing unit obtaining the first sound information from the first processing unit as the second sound information.

Optionally, after the second processing unit obtaining the first sound information from the first processing unit, the method further includes:

After the second processing unit obtaining the first sound information, sending an OFF instruction to the first processing unit, and the first processing unit executing the OFF instruction to make the first processing unit be in the disabled status.

Optionally, the second processing unit generating the first acoustic control instruction corresponding to the second sound information based on the correspondence relationship between the sound information and the acoustic control instruction specifically includes:

Deciding whether there is content information conforming to the second preset condition in the first sound information;

When there is the content information conforming to the second preset condition in the first sound information, the second processing unit generating the first acoustic control instruction corresponding to the second sound information based on the correspondence relationship between the sound information and the acoustic control instruction.

Optionally, the second processing unit obtaining the second sound information of the first user specifically includes:

Deciding whether there is content information conforming to the second preset condition in the first sound information;

When there is no content information conforming to the second preset condition in the first sound information, the second processing unit obtaining the second sound information different from the first sound information.

Optionally, the second processing unit generating the first acoustic control instruction corresponding to the second sound information based on the correspondence relationship between the sound information and the acoustic control instruction specifically includes:

Deciding whether there is content information conforming to the second preset condition in the second sound information;

When there is the content information conforming to the second preset condition in the second sound information, the second processing unit generating the first acoustic control instruction corresponding to the second sound information based on the correspondence relationship between the sound information and the acoustic control instruction.

In another aspect, the embodiment of this application also provides an electronic apparatus for information processing, including:

A first processing unit whose power consumption is a first power consumption,

A second processing unit connected to the first processing unit, and, the power consumption of the second processing unit is a second power consumption which is larger than the first power consumption, wherein, When the second processing unit is in the disabled status, the first processing unit is for obtaining the first sound information of the first user; and deciding whether the first sound information satisfies the first preset condition; and generating a trigger instruction and sending the trigger instruction to the second processing unit when the first sound information satisfies the first preset condition;

The second processing unit is for, after being in the enabled status based on the trigger instruction, obtaining the second sound information of the first user; and generating the first acoustic control instruction corresponding to the second sound information based on the correspondence relationship between the sound information and the acoustic control instruction.

Optionally, the electronic apparatus further includes:

An executing unit for obtaining an ON instruction when the first processing unit is in the disabled status, and executing the ON instruction to make the first processing unit be in the enabled status.

Optionally, when the first voiceprint information of the first user is included in the first sound information, the first processing unit specifically is:

A unit for the first processing unit deciding whether the first voiceprint information matches pre-stored standard voiceprint information of the first user.

Optionally, the electronic apparatus further includes a deleting unit for deleting the first sound information when the first sound information does not satisfy the first preset condition.

Optionally, the second processing unit specifically is:

A unit for obtaining the first sound information from the first processing unit as the second sound information.

Optionally, the electronic apparatus further includes:

A sending unit for sending an OFF instruction to the first processing unit when the second processing unit obtains the first sound information, to make the first processing unit be in the disabled status by executing the OFF instruction.

Optionally, the second processing unit specifically includes:

A first deciding subunit for deciding whether there is content information conforming to the second preset condition in the first sound information;

A first generating subunit for, when there is the content information conforming to the second preset condition in the first sound information, generating the first acoustic control instruction corresponding to the second sound information based on the correspondence relationship between the sound information and the acoustic control instruction.

Optionally, the second processing unit specifically includes:

A second deciding subunit for deciding whether there is content information conforming to the second preset condition in the first sound information;

An obtaining subunit for, when there is no content information conforming to the second preset condition in the first sound information, obtaining the second sound information different from the first sound information.

Optionally, the second processing unit specifically includes:

A third deciding subunit for deciding whether there is content information conforming to the third preset condition in the second sound information;

A second generating subunit for, when there is the content information conforming to the second preset condition in the second sound information, generating the first acoustic control instruction corresponding to the second sound information based on the correspondence relationship between the sound information and the acoustic control instruction.

The one or more technical solutions provided in the eighth embodiments of this application at least have the following technical effects or advantages:

(1) Since in the embodiment of this application, the technical means that a processing unit with lower power consumption implements the work of voice recognition, and then the acoustic control system is triggered after the collected sound information satisfying a preset condition of the voice recognition is decided is adopted, the technical problem that the voice recognition can be only implemented by the acoustic control system so that the acoustic control system is triggered ceaselessly, which results in extreme power consumption in the prior arts is solved, and technical effect of saving power consumption is achieved.

(2) Since in the embodiment of this application, the technical means that an MCU monitoring system with low power consumption implements the work of sound recognition is adopted, the technical problem that power is consumed in the procedure of the acoustic control system carrying out the voice recognition, so that there may be undersupply when the acoustic control system carries out voice content recognition and generates instructions subsequently in the prior arts, and technical effect of increasing stand-by time of the entire acoustic control system is achieved.

The eighth embodiment of this application is for solving the technical problem that the acoustic control system is triggered ceaselessly in order for voice recognition so that it causes extreme power consumption in the prior arts by providing an information processing method and electronic apparatus.

The technical solution of the embodiment of this application has an overall idea as follows for solving the above problem:

There is provided an information processing method applied in an electronic apparatus including a first processing unit whose power consumption is a first power consumption and a second processing unit connected to the first processing unit, wherein, the power consumption of the second processing unit is a second power consumption which is larger than the first power consumption, the method including:

When the second processing unit is in a disabled status, the first processing unit obtaining first sound information of a first user;

The first processing unit deciding whether the first sound information satisfies a first preset condition;

The first processing unit generating a trigger instruction and sending the trigger instruction to the second processing unit to make the second processing unit be in an enabled status when the first sound information satisfies the first preset condition;

The second processing unit obtaining second sound information of the first user;

The second processing unit generating a first acoustic control instruction corresponding to the second sound information based on correspondence relationship between the sound information and the acoustic control instruction.

It can be seen that, since this application adopts the technical means that a processing unit with lower power consumption implements the work of voice recognition, and then the acoustic control system is triggered after the collected sound information satisfying a preset condition of the voice recognition is decided, the technical problem that the voice recognition can be only implemented by the acoustic control system so that the acoustic control system is triggered ceaselessly, which results in extreme power consumption in the prior arts is solved, and technical effect of saving power consumption is achieved.

For understanding the above-described technical solution better, the above-described technical solution is explained in detail in combination with the accompanying drawings of the specification and the specific implementation mode.

This application provides an information processing method applied in the acoustic control system, in the conventional acoustic control system, when the acoustic control system comes into contact with sound (for example, the voice of the user, or other sound of the user, for example, cough sound) in the environment, in order for the voice recognition work, the acoustic control system is triggered ceaselessly, so as to consume lots of electric power of the acoustic control system. The solution of this application is adding an MCU monitoring system with low power consumption integrated with Flash on the basis of the acoustic control system, and the voice recognition work is implemented by the MCU monitoring system with low power consumption. When the collected sound information is recognized by the MCU monitoring system with low power consumption, then the acoustic control system is triggered, to carry out analyses and running of sound content. That is, this application adopts two parts of the MCU monitoring system with low power consumption and the original acoustic control system to implement work of the acoustic control system in the prior arts.

Figure 10:
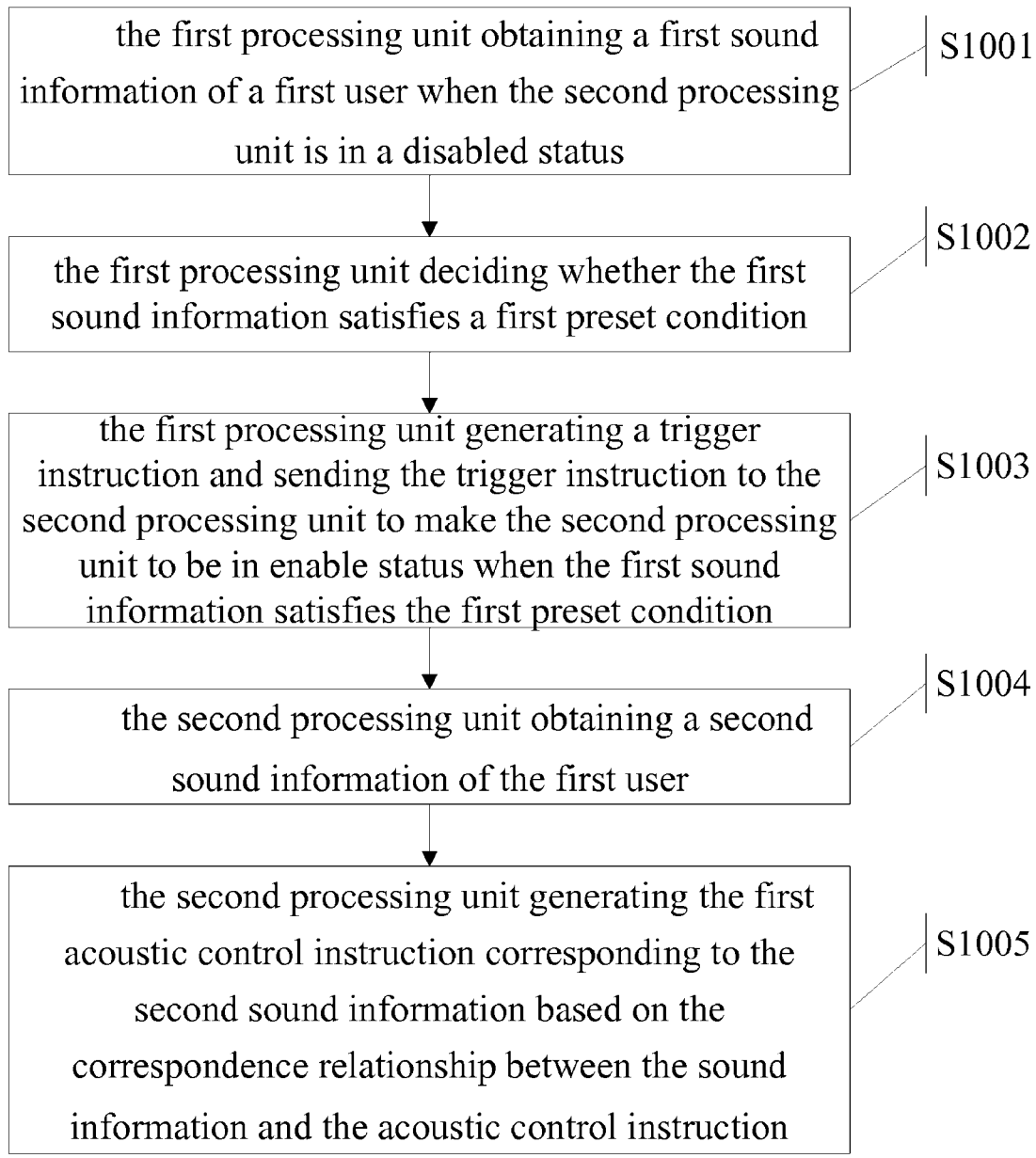
FIG. 10 is a flow chart of information processing method provided by the eighth embodiment of this application.

As shown in FIG. 10, the information processing method provided by this application specifically includes steps of:

S1001: when the second processing unit is in a disabled status, the first processing unit obtaining first sound information of a first user;

Before S1001, there further includes step of:

When the first processing unit is in the disabled status, obtaining an ON instruction, and executing the ON instruction to make the first processing unit be in the enabled status.

In the specific implementation procedure, the first processing unit in the solution of this application refers to the MCU monitoring system with low power consumption, the second processing unit refers to the acoustic control system only carrying out the work of sound content recognition, first, the MCU monitoring system with low power consumption obtains an ON instruction, and enters the working status after the ON instruction is executed, the ON instruction may be a manual power switch, and may be also an infrared switch (for example, the MCU monitoring system with low power consumption is triggered to enter an ON status once the door is opened), and so on.

The first processing unit (the MCU monitoring system with low power consumption) entering an ON status and the second processing unit (the acoustic control system) being in a STANDBY status is a most usual status of the acoustic control system provided by this application, and in this status, the MCU monitoring system with low power consumption collects sound information of the user in the environment, which is the first sound information described in step S1001.

It can be seen that, since this application adopts the technical means that the MCU monitoring system with low power consumption combines with the acoustic control system to carry out acoustic control processing, and only the MCU monitoring system with low power consumption is in an always ON status, the sound information is collected by using the MCU monitoring system with low power consumption, it solves the technical problem that the sound information can only be collected by the acoustic control system so as to cause the acoustic control system to be triggered frequently, and achieves the technical effect of saving power consumption.

S1002: the first processing unit deciding whether the first sound information satisfies a first preset condition;

When the first sound information includes the first voiceprint information of the first user, step S1002 specifically is:

The first processing unit deciding whether the first voiceprint information matches pre-stored standard voiceprint information of the first user.

When the first sound information does not satisfy the first preset condition, the first processing unit deleting the first sound information.

In the specific implementation procedure, the MCU monitoring system with low power consumption is in an ON status to collect the sound information in the environment, sound in the environment is various, and the MCU low power consumption carries out voiceprint information decision only when there is voiceprint information in the acquired sound information;

The MCU monitoring system with low power consumption adopted in this application monitors input of mic signals of the acoustic control system, and is specifically implemented by integrating Flash to MCU, the working process of the MCU is as follows: first, the collected sound information having voiceprint characteristic is carried out a frequency analysis and compiled into data and arranged as a spectrogram, then the spectrogram is compared with the spectrogram of the standard voiceprint information of the user pre-stored in the MCU monitoring system, if they are matched, it represents that the sound information collected by the MCU monitoring system with low power consumption this time satisfies the voiceprint condition of initiating the acoustic control system; and if they are not matched, the MCU monitoring system deletes the collected voiceprint information and continue to carry out the work of the next sound information collection and decision.

It can be seen that, since this application adopts the MCU monitoring system with low power consumption to implement the work of sound recognition, it solves the technical problem that the work of voice recognition is carried out by the acoustic control system, so that electric power is consumed, which results in that there may be undersupply when the acoustic control system carries out voice content recognition and generates instructions subsequently, and achieves technical effect of increasing stand-by time of the acoustic control system.

S1003: the first processing unit generating a trigger instruction and sending the trigger instruction to the second processing unit to make the second processing unit be in enabled status when the first sound information satisfies the first preset condition;

In the specific implementation procedure, after the MCU monitoring system with low power consumption decides that the collected sound information conforms to the preset voiceprint characteristic of the user by integrating Flash, a trigger signal is generated and input to the acoustic control system, to enable the acoustic control system so as to make the acoustic control system be in the enabled status.

After step S1003, the embodiment of this application enters step S1004 of the second processing unit obtaining the second sound information of the first user;

In the specific implementation procedure, there are two kinds of the implementation mode of S1004, when the acoustic control system obtains trigger signal of the MCU monitoring system with low power consumption and is enabled, it carries out work of sound content recognition, there are two kinds of the source of obtaining sound content information by the acoustic control system:

The first kind: the second processing unit obtains the first sound information from the first processing unit as the second sound information, that is, the MCU monitoring system with low power consumption sends the first sound information satisfying the pre-stored standard voiceprint information of the user to the acoustic control system, and the acoustic control system carries out the work of sound content recognition directly based on the first sound information.

The second kind: the acoustic control system acquires the second sound information satisfying the voiceprint characteristic of the user separately after the MCU monitoring system with low power consumption carries out the step of voiceprint decision.

After step S1004, in order to shorten flows of the entire acoustic control procedure and increase velocity of the acoustic control and further save electric power, the method of the embodiment of this application further includes a step of:

After the second processing unit obtaining the first sound information, sending an OFF instruction to the first processing unit, and the first processing unit executing the OFF instruction to make the first processing unit be in the disabled status.

In the specific implementation procedure, after the acoustic control system receives the first sound information satisfying the preset condition sent by the MCU monitoring system with low power consumption, an OFF signal is sent to the MCU monitoring system to make the MCU monitoring system be disabled, that is, it can be understood as only using the MCU monitoring system to do the decision of voiceprint information characteristic once and disabling the MCU monitoring system after deciding that the condition is satisfied, the subsequent sound information is collected directly by the acoustic control system, and the acoustic control system carries out the work of recognition of the sound content directly without the step of the voiceprint decision.

It can be seen that, when there is sound of only one user in the environment, instead of carrying out decision process of voiceprint characteristic for each sentence, when the sound thereof satisfies the preset condition, the step of recognition and execution of the sound content can be carried out directly. So, this application adopts the technical means that after the MCU monitoring system decides that the collected sound information satisfies the condition, the MCU monitoring system is disabled to no longer carry out the step of decision of voiceprint characteristic, and the subsequent step of recognition and execution of the sound content is carried out by the acoustic control system directly, so as to achieve technical effect of reducing the work flows of the system so as to improve the work efficiency of the acoustic control system and further save power consumption.

After step S1004, the method of the embodiment of this application enters step S1005 of the second processing unit generating the first acoustic control instruction corresponding to the second sound information based on the correspondence relationship between the sound information and the acoustic control instruction.

In the specific implementation procedure, the acoustic control system converts the obtained content information of the sound information to a specific execution command based on correspondence relationship between the sound content information and the acoustic control instruction, wherein, the correspondence relationship between the sound content information and the acoustic control instruction may be pre-stored locally in the acoustic control system, or acquired from a remote end through network.

The case of processing the sound information by combining the MCU monitoring system (deciding match degree of the voiceprint characteristic) the acoustic control system (extracting content and generating instruction) is explained by a table of the correspondence relationship in the embodiment of this application as follows:

TABLE I

| Sound information (voiceprint + content) | Voiceprint characteristic match degree | Content extraction | Generating instruction |
|---|---|---|---|
| Playing music | Satisfy | With content | Opening the player to play preset music file |
| Noise | Satisfy | No content | |
| Watching television | Not satisfy | | |

Figure 11:
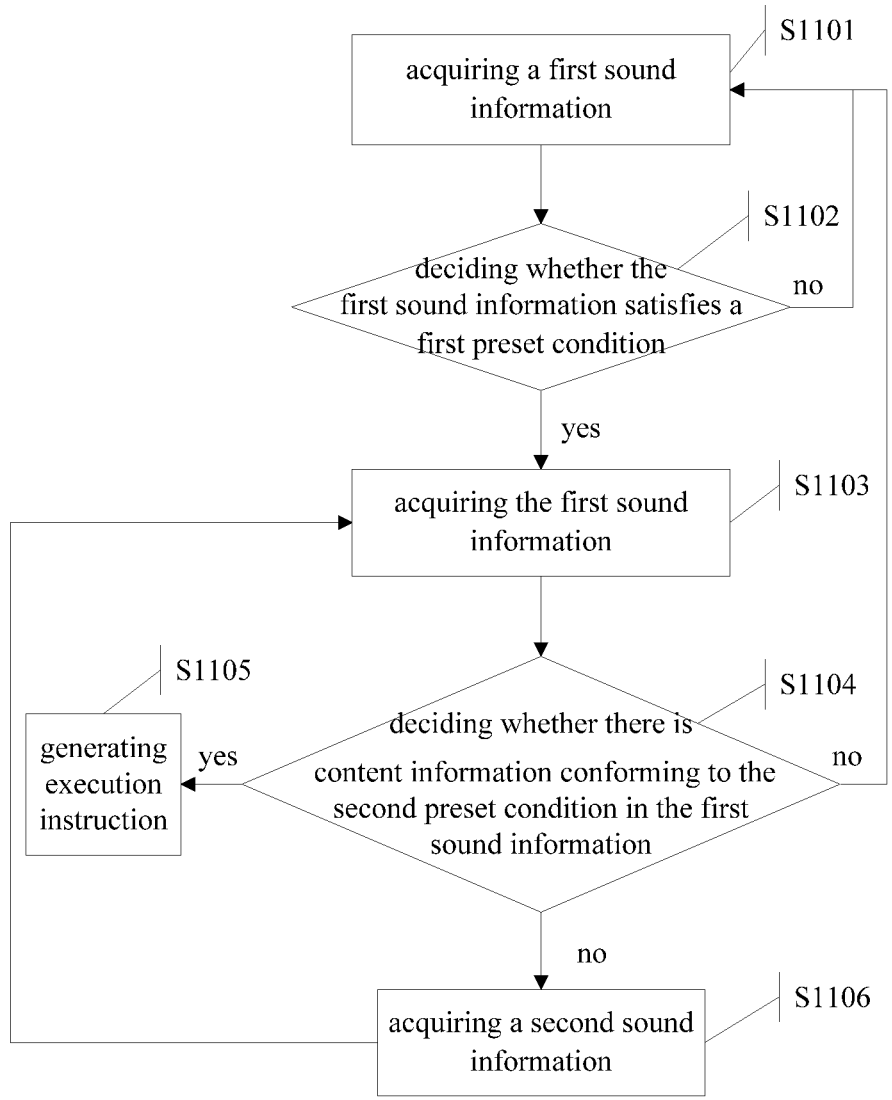
FIG. 11 is a schematic diagram of flows of deciding acquired sound information by la ow power consumption MCU monitoring system and an acoustic control system provided by the eighth embodiment of this application.

FIG. 11 is a schematic flow chart of the decision of the acquired sound information by the MCU monitoring system with low power consumption and corresponding to steps S1001 to S1005 provided by the embodiment of this application.

As show in FIG. 11, when the second sound information obtained by the second processing unit is from the first processing unit, i.e., when the second sound information is the same as the first sound information, step 1005 specifically includes:

S1104, deciding whether there is content information conforming to the second preset condition in the first sound information;

S1105, when there is the content information conforming to the second preset condition in the first sound information, the second processing unit generating the first acoustic control instruction corresponding to the second sound information based on the correspondence relationship between the sound information and the acoustic control instruction.

In the specific implementation procedure, as shown in Table 1, the MCU monitoring system carries out voiceprint characteristic decision to the obtained first sound information "playing music", and after the voiceprint characteristic match degree satisfies the preset condition, the acoustic control system carries out content information extraction to the sentence "playing music" after obtaining the first sound information "playing music" sent by the MCU monitoring system, and, after executable content information "playing music" is extracted, the acoustic control system converts "playing music" to a specific execution command of "opening the player to play preset music file" based on the correspondence relationship between the content of this sentence "playing music" and the acoustic control instruction, and then sends the execution command to instruction executing device of the music player.

When there is no content information conforming to the second preset condition in the first sound information, in S1106, the second processing unit obtains the second sound information different from the first sound information.

In the specific implementation procedure, if the acoustic control system cannot extract content information from the first sound information, it represents that though voiceprint information matching the pre-stored standard voiceprint information of the user is extracted in the first sound information collected by the MCU monitoring system, there is no substantial content information needs to be executed therein, the acoustic control system will continue to acquire the sound information. At this time, the sound information acquired by the acoustic control system once more is as described in implementation procedure of step S1004, that is, in the case that the MCU monitoring system is disabled, the acoustic control system acquires the sound information by itself and executes the work of sound content recognition directly, and in the case that the MCU monitoring system is not disabled, it may be the acoustic control system acquiring the sound information by itself, or the MCU monitoring system acquiring it firstly and inputting to the acoustic control system after carrying out decision of voiceprint information characteristic (that is, no matter there is only sound of only one user in the environment, the sound information needs to be subjected to two procedures of decision of voiceprint information characteristic and recognition of sound content information).

After the acoustic control system acquires the second sound information different from the first sound information, step S1005 specifically includes:

S1104, deciding whether there is content information conforming to the second preset condition in the second sound information;

S1105, when there is the content information conforming to the second preset condition in the first sound information, the second processing unit generating the first acoustic control instruction corresponding to the second sound information based on the correspondence relationship between the sound information and the acoustic control instruction.

In the specific implementation procedure, as shown in Table 1, when the noise issued by the user by accident in the environment is collected by the MCU monitoring system, the MCU monitoring system carries out decision of voiceprint characteristic match degree thereto, when the noise satisfies the voiceprint characteristic match degree but the acoustic control system cannot acquire content information of the noise, the acoustic control system would automatically delete information of the noise until sound information having content information is acquired, then a corresponding execution command is generated and sent to the device executing command.

It can be seen that, the embodiment of this application adopts the technical means that after the MCU monitoring system decides that the collected sound information satisfies the condition, the MCU monitoring system is disabled to no longer carry out the step of decision of voiceprint characteristic and subsequent steps of recognition and execution of voice content are carried out by the acoustic control system directly, it achieves the technical effect of reducing steps of the flows of acoustic control, improving work efficiency of the acoustic control system and further saving power consumption.

Figure 12:
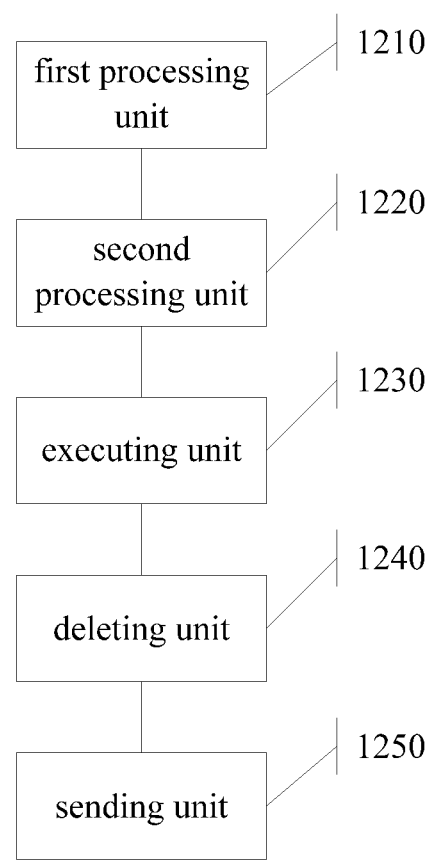
FIG. 12 is a structural diagram of the electronic apparatus for information processing provided by the eighth embodiment of this application.

Based on the same inventive concept, the eighth embodiment of this application further provides an electronic apparatus for information processing, as shown in FIG. 12, the electronic apparatus specifically includes:

A first processing unit 1210 whose power consumption is a first power consumption, A second processing unit 1220 connected to the first processing unit 1210, and, the power consumption of the second processing unit 1220 is a second power consumption which is larger than the first power consumption, wherein, When the second processing unit 1220 is in the disabled status, the first processing unit 1210 is for obtaining the first sound information of the first user; and deciding whether the first sound information satisfies the first preset condition; and generating a trigger instruction and sending the trigger instruction to the second processing unit 1220 when the first sound information satisfies the first preset condition;

The second processing unit 1220 is for, after being in the enabled status based on the trigger instruction, obtaining the second sound information of the first user; and generating the first acoustic control instruction corresponding to the second sound information based on the correspondence relationship between the sound information and the acoustic control instruction.

Further, the electronic apparatus further includes:

An executing unit 1230 for obtaining an ON instruction when the first processing unit 1210 is in the disabled status, and executing the ON instruction to make the first processing unit 1210 be in the enabled status.

Further, when the first voiceprint information of the first user is included in the first sound information, the first processing unit 1210 specifically is:

A unit for the first processing unit 1210 deciding whether the first voiceprint information matches pre-stored standard voiceprint information of the first user.

Preferably, the electronic apparatus further includes a deleting unit 1240 for deleting the first sound information when the first sound information does not satisfy the first preset condition.

Further, the second processing unit 1220 specifically is:

A unit for obtaining the first sound information from the first processing unit 1210 as the second sound information.

Further, the electronic apparatus further includes:

A sending unit 1250 for sending an OFF instruction to the first processing unit 1210 after the second processing unit 1220 obtains the first sound information, to make the first processing unit 1210 be in the disabled status by executing the OFF instruction.

Figure 13:
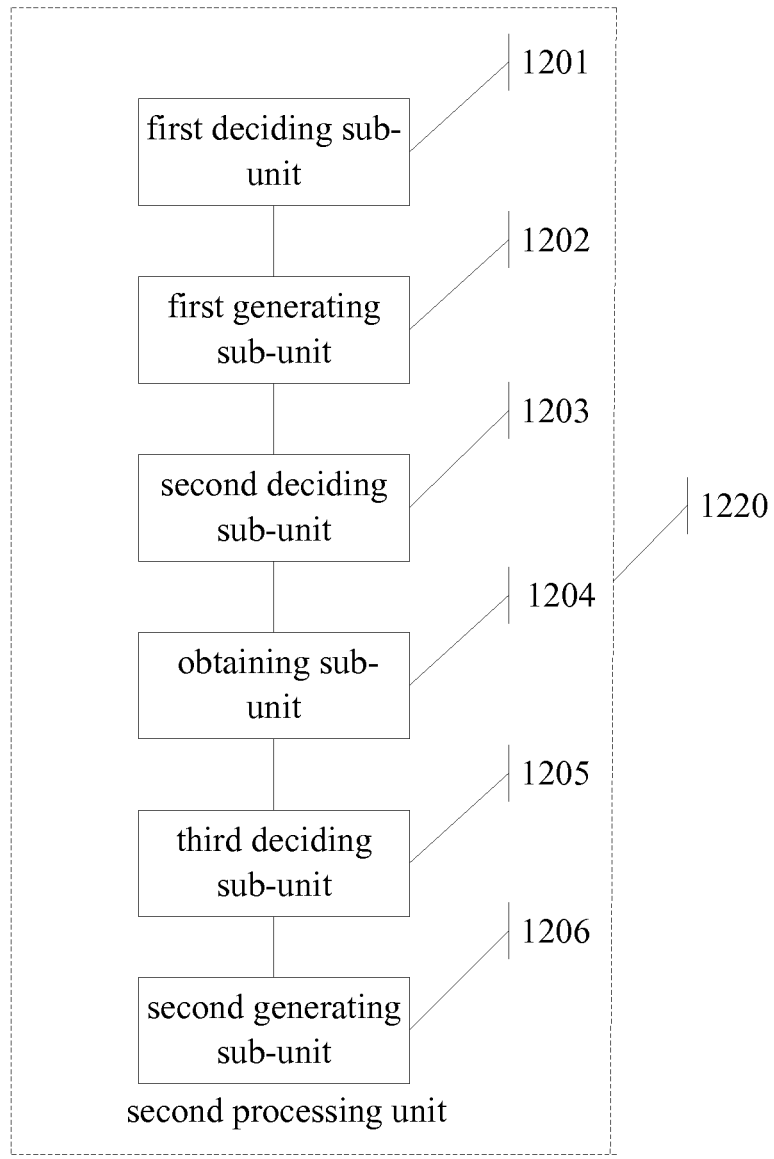
FIG. 13 is a structural diagram of the second processing unit provided by the eighth embodiment of this application.

Further, as shown in FIG. 13, the second processing unit 1220 specifically includes:

A first deciding subunit 1201 for deciding whether there is content information conforming to the second preset condition in the first sound information;

A first generating subunit 1202 for, when there is the content information conforming to the second preset condition in the first sound information, generating the first acoustic control instruction corresponding to the second sound information based on the correspondence relationship between the sound information and the acoustic control instruction.

Further, the second processing unit 1220 further includes:

A second deciding subunit 1203 for deciding whether there is content information conforming to the second preset condition in the first sound information;

An obtaining subunit 1204 for, when there is no content information conforming to the second preset condition in the first sound information, obtaining the second sound information different from the first sound information.

Further, the second processing unit 1220 specifically includes:

A third deciding subunit 1205 for deciding whether there is content information conforming to the third preset condition in the second sound information;

A second generating subunit 1206 for, when there is the content information conforming to the second preset condition in the second sound information, generating the first acoustic control instruction corresponding to the second sound information based on the correspondence relationship between the sound information and the acoustic control instruction.

The one or more technical solutions provided in the eighth embodiments of this application at least have the following technical effects or advantages:

(1) Since in the embodiment of this application, the technical means that a processing unit with lower power consumption implements the work of voice recognition, and then the acoustic control system is triggered after the collected sound information satisfying a preset condition of the voice recognition is decided is adopted, the technical problem that the voice recognition can be only implemented by the acoustic control system so that the acoustic control system is triggered ceaselessly, which results in extreme power consumption in the prior arts is solved, and technical effect of saving power consumption is achieved.

(2) Since in the embodiment of this application, the technical means that the MCU monitoring system with low power consumption implements the work of sound recognition is adopted, the technical problem that power is consumed in the procedure of the acoustic control system carrying out the voice recognition, so that there may be undersupply when the acoustic control system carries out voice content recognition and generates instruction subsequently in the prior arts, and technical effect of increasing stand-by time of the entire acoustic control system is achieved.

Here, those skilled in the art can understand, the information processing method and electronic apparatus according to the first embodiment of the present invention, the information processing method and electronic apparatus according to the second to the seventh embodiments the present invention and the information processing method and electronic apparatus according to the eighth embodiment of the present invention can be applied separately, or applied in combination with each other. For example, the information processing method and electronic apparatus according to the first embodiment of the present invention can be combined with the information processing method and electronic apparatus according to the second to the seventh embodiments of the present invention, the information processing method and electronic apparatus according to the first embodiment of the present invention can be combined with the information processing method and electronic apparatus according to the eighth embodiment of the present invention, and the information processing method and electronic apparatus according to the second to the seventh embodiments of the present invention can be combined with the information processing method and electronic apparatus according to the eighth embodiment of the present invention. And, all of the three of the information processing method and electronic apparatus according to the first embodiment of the present invention, the information processing method and electronic apparatus according to the second to the seventh embodiments of the present invention, and the information processing method and electronic apparatus according to the eighth embodiment of present invention can be combined together.

When the information processing method and electronic apparatus according to the first embodiment of the present invention are applied singlely, the information processing method and electronic apparatus according to the embodiments of the present invention can be configured as follows:

(1) An information processing method applied in an electronic apparatus having voice recognition service, the method including:

Obtaining first voice information;

Recognizing the first voice information by a first recognition model to obtain a first recognition result;

Deciding whether the first recognition result conforms to a first preset condition;

Recognizing the first voice information by a second recognition model different from the first recognition model to obtain a second recognition result when the first recognition result conforms to the first preset condition;

Controlling the electronic apparatus to execute a corresponding control instruction based on the second recognition result.

(2) The method according to (1), wherein, when the first recognition result does not conform to the first preset condition, the method further includes:

Discarding the first voice information.

(3) The method according to (1), wherein, before recognizing the first voice information by the first recognition model, the method further includes:

Deciding whether the first voice information satisfies the second preset condition;

Discarding the first voice information when the first voice information does not satisfy the second preset condition;

Executing a step of recognizing the first voice information by the first recognition model when the first voice information satisfies the second preset condition.

(4) The method according to (1), wherein, recognizing the first voice information by the first recognition model to obtain the first recognition result specifically is:

Recognizing whether the user corresponding to the first voice information is a predetermined user to obtain the first recognition result; wherein, when the user corresponding to the first voice information is not the predetermined user, it represents that the first voice information does not satisfy the first preset condition, and when the user corresponding to the first voice information is the predetermined user, it represents that the first voice information satisfies the first preset condition.

(5) The method according to (1), wherein, obtaining the first voice information specifically includes:

Carrying out end-point detection to the first voice information to obtain the detected first voice information.

(6) The method according to (1), wherein, when the first recognition result conforms to the first preset condition, recognizing the first voice information by the second recognition model different from the first recognition model to obtain the second recognition result specifically is:

Recognizing the first voice information by the second recognition model to obtain a third recognition result;

Obtaining the second recognition result based on the first recognition result and the third recognition result.

(7) The method according to (1), wherein, the voice recognition service is in an inactive status, and when control instruction corresponding to the second recognition result is a wakening instruction, controlling the electronic apparatus to execute the corresponding control instruction based on the second recognition result specifically is:

Executing the wakening instruction to waken the voice recognition service.

(8) An electronic apparatus having voice recognition service, the electronic apparatus includes:

A circuit board;

A sound acquiring unit connected to the circuit board and for obtaining first voice information;

A processing chip provided on the circuit board and for recognizing the first voice information by a first recognition model to obtain a first recognition result; deciding whether the first recognition result conforms to a first preset condition; recognizing the first voice information by a second recognition model different from the first recognition model to obtain a second recognition result when the first recognition result conforms to the first preset condition;

A first control chip provided on the circuit board and for controlling the electronic apparatus to execute a corresponding control instruction based on the second recognition result.

(9) The electronic apparatus according to (8), wherein, the processing chip is further specifically for discarding the first voice information when the first recognition result does not conform to the first preset condition.

(10) The electronic apparatus according to (8), wherein, the processing chip includes a first sub-processing chip and a second sub-processing chip, the first sub-processing chip is specifically for deciding whether the first voice information satisfies a second preset condition; discarding the first voice information when the first voice information does not satisfy the second preset condition; and the second sub-processing chip is specifically for recognizing the first voice information by the first recognition model when the first voice information satisfies the second preset condition.

(11) The electronic apparatus according to (10), wherein, the processing chip further specifically includes a third sub-processing chip, which is specifically for recognizing whether a user corresponding to the first voice information is a predetermined user to obtain the first recognition result; wherein, when the user corresponding to the first voice information is not the predetermined user, it represents that the first voice information does not satisfy the first preset condition, and when the user corresponding to the first voice information is the predetermined user, it represents that the first voice information satisfies the first preset condition.

(12) The electronic apparatus according to (8), wherein, the sound acquiring unit further includes a detecting chip for carrying out end-point detection to the first voice information to obtain the detected first voice information.

(13) The electronic apparatus according to (8), wherein, the processing chip further includes a fourth sub-processing chip for recognizing the first voice information by the second recognition model to obtain a third recognition result when the first recognition result conforms to the first preset condition and obtaining the second recognition result based on the first recognition result and the third recognition result.

(14) The electronic apparatus according to (8), wherein, the voice recognition service is in an inactive status, when the control instruction corresponding to the second recognition result is a wakening instruction, the first control chip is specifically for executing the wakening instruction to waken the voice recognition service.

When the information processing method and electronic apparatus according to the first embodiment of the present invention are combined with the information processing method and electronic apparatus according to the second to the seventh embodiments the present invention, the information processing method and electronic apparatus according to the embodiments of the present invention can be configured as follows:

(15) The information processing method according to any one of (1) to (7), wherein:

The electronic apparatus includes at least two different voice recognition modules, the method further includes:

Obtaining that the current mode of the electronic apparatus is a first usage mode;

Determining the voice recognition module corresponding to the first usage mode is a first voice recognition module in the at least two different voice recognition modules based on correspondence relationship between the usage mode and the voice recognition module; and Recognizing the first voice information by the second recognition model different from the first recognition model to obtain the second recognition result when the first recognition result conforms to the first preset condition specifically is:

Recognizing the first voice information using the second recognition model different from the first recognition model by the first voice recognition module to obtain the second recognition result when the first recognition result conforms to the first preset condition.

(16) The method according to (15), wherein, before obtaining that the current mode of the electronic apparatus is the first usage mode, the method further includes:

Detecting to obtain second voice information when the electronic apparatus is in a second usage mode;

Recognizing the second voice information by a second voice recognition module corresponding to the second usage mode in the at least two different voice recognition modules, to determine whether there is a first control instruction controlling the electronic apparatus to enter the first usage mode;

Controlling the electronic apparatus to enter the first usage mode when there is the first control instruction.

(17) The method according to (16), wherein, after determining whether there is the first control instruction for controlling the electronic apparatus to enter the first usage mode, the method further includes:

Recording third voice information input by the user between a first moment of generating the first control instruction and a second moment of switching to the first usage mode when there is the first control instruction.

(18) The method according to (17), wherein, after recording the third voice information input by the user when the electronic apparatus switches to the first usage mode from the second usage mode, the method further includes:

Storing the third voice information in the memory of the electronic apparatus.

(19) The method according to (18), wherein, obtaining the first voice information specifically includes:

Reading the third voice information from the memory;

Acquiring first sub-voice information that has not been carried out voice recognition by the second voice recognition module in the third voice information, the first sub-voice information being the first voice information.

(20) The method according to (16), wherein, after controlling the electronic apparatus to enter the first usage mode, the method further includes:

Deciding whether there is a second control instruction for enabling the first voice recognition module;

Executing a step of determining the voice recognition module corresponding to the first usage mode as the first voice recognition module based on the correspondence relationship between the usage mode and the voice recognition module after deciding there is the second control instruction.

(21) The method according to (16), wherein, after determining the voice recognition module corresponding to the first usage mode as the first voice recognition module, the method further includes:

Disabling the second voice recognition module.

(22) The method according to any one of (15) to (21), wherein, the first voice recognition module is a software voice recognition module or a hardware voice recognition module, and the second voice recognition module is a hardware voice recognition module;

The first usage mode is a usage mode corresponding to an ON status, and the second usage mode is an OFF/STANDBY mode.

(23) The method according to any one of (15) to (21), wherein, determining the voice recognition module corresponding to the first usage mode as the first voice recognition module based on the correspondence relationship between the usage mode and the voice recognition module specifically is:

Determining that the voice recognition module corresponding to the first usage mode is the software voice recognition module based on the correspondence relationship between the usage mode and the voice recognition module when the first usage mode is a usage mode whose power consumption is larger than a first preset threshold;

Determining that the voice recognition module corresponding to the first usage mode is the hardware voice recognition module when the first usage mode is a usage mode whose power consumption is less than the first preset threshold.

(24) The method according to any one of (1) to (7), which is applied in an electronic apparatus, wherein, before obtaining the first voice information, the method further includes:

Detecting to obtain a fourth voice information to be recognized when the electronic apparatus is in a second usage mode, wherein, the second usage mode is a corresponding usage mode when the electronic apparatus is in a power saving status;

Carrying out voice recognition to the fourth voice information by a second voice recognition module corresponding to the second usage mode, to determine whether there is a first control instruction for controlling the electronic apparatus to enter the first usage mode;

Controlling the electronic apparatus to enter the first usage mode when there is the first control instruction, wherein, the first usage mode is a corresponding usage mode when the electronic apparatus is in a normal working status.

(25) The method according to (24), wherein, acquiring the first voice information specifically includes:

Determining the first voice recognition module corresponding to the first usage mode; and Acquiring the first voice information;

Recognizing the first voice information by the second recognition model different from the first recognition model to obtain the second recognition result when the first recognition result conforms to the first preset condition specifically is:

Recognizing the first voice information using the second recognition model different from the first recognition model by the first voice recognition module to obtain the second recognition result when the first recognition result conforms to the first preset condition.

(26) The method according to (25), wherein, after determining whether there is the first control instruction for controlling the electronic apparatus to enter the first usage mode, the method further includes:

Recording third voice information input by the user between a first moment of generating the first control instruction and a second moment of switching to the first usage mode when there is the first control instruction.

(27) The method according to (26), wherein, acquiring the first voice information specifically is:

Acquiring first sub-voice information that has not been carried out voice recognition by the second voice recognition module in the third voice information, the first sub-voice information being the first voice information.

(28) The electronic apparatus according to any one of (8) to (14), wherein:

The electronic apparatus includes at least two different voice recognition modules, the electronic apparatus further includes:

A first obtaining chip for obtaining that the current mode of the electronic apparatus is the first usage mode;

A first determining chip for determining the voice recognition module corresponding to the first usage mode as the first voice recognition module in the at least two different voice recognition modules based on the correspondence relationship between the usage mode and the voice recognition module;

The processing chip is specifically for recognizing the first voice information using the second recognition model different from the first recognition model by the first voice recognition module to obtain the second recognition result when the first recognition result conforms to the first preset condition.

(29) The electronic apparatus according to (28), wherein, the electronic apparatus further includes:

A first detecting chip for detecting whether there is a first control instruction for controlling the electronic apparatus to enter the first usage mode by the second voice recognition module corresponding to the second usage mode in the at least two different voice recognition modules when the electronic apparatus is in the second usage mode before obtaining that the current mode of the electronic apparatus is the first usage mode;

A second control chip for controlling the electronic apparatus to enter the first usage mode when there is the first control instruction.

(30) The electronic apparatus according to (29), wherein, the electronic apparatus further includes:

A first recording chip for recording the third voice information input by the user between a first moment of generating the first control instruction and a second moment of switching to the first usage mode when there is the first control instruction after determining whether there is the first control instruction for controlling the electronic apparatus to enter the first usage mode.

(31) The electronic apparatus according to (30), wherein, the electronic apparatus further includes:

A storage chip for storing the third voice information in a memory of the electronic apparatus after recording the third voice information input by the user when the electronic apparatus is switched to the first usage mode from the second usage mode.

(32) The electronic apparatus according to (30), wherein, the sound acquiring unit specifically includes:

A reading sub-chip for reading the third voice information from the memory;

An acquiring sub-chip for acquiring first sub-voice information that has not been carried out voice recognition by the second voice recognition module in the third voice information, the first sub-voice information being the first voice information.

(33) The electronic apparatus according to (29), wherein, the electronic apparatus further includes:

A deciding chip for deciding whether there is a second control instruction for enabling the first voice recognition module after controlling the electronic apparatus to enter the first usage mode; and Executing a step of determining the voice recognition module corresponding to the first usage mode as the first voice recognition module based on the correspondence relationship between the usage mode and the voice recognition module after deciding there is the second control instruction.

(34) The electronic apparatus according to (29), wherein, the electronic apparatus further includes:

A disabling chip for disabling the second voice recognition module after determining the voice recognition module corresponding to the first usage mode as the first voice recognition module.

(35) The electronic apparatus according to any one of (28) to (34), wherein, the first voice recognition module is a software voice recognition module or a hardware voice recognition module, and the second voice recognition module is a hardware voice recognition module;

The first usage mode is a usage mode corresponding to an ON status; the second usage mode is an OFF/STANDBY mode.

(36) The electronic apparatus according to any one of (28) to (34), wherein, the first determining chip specifically includes:

A first determining sub-chip for determining that the voice recognition module corresponding to the first usage mode is a software voice recognition module based on the correspondence relationship between the usage mode and the voice recognition module when the first usage mode is a usage mode whose power consumption is larger than a first preset threshold;

A second determining sub-chip for determining that the voice recognition module corresponding to the first usage mode is a hardware voice recognition module when the first usage mode is a usage mode whose power consumption is less than the first preset threshold.

(37) The electronic apparatus according to any one of (8) to (14), wherein, the electronic apparatus includes:

A second detecting chip for detecting to obtain second voice information to be recognized when the electronic apparatus is in a second usage mode, wherein, the second usage mode is a corresponding usage mode when the electronic apparatus is in a power saving status;

A second determining chip for determining whether there is a first control instruction for controlling the electronic apparatus to enter the first usage mode by carrying out voice recognition to the second voice information to be recognized by the second voice recognition module corresponding to the second usage mode;

A second control chip for controlling the electronic apparatus to enter the first usage mode when there is the first control instruction, wherein, the first usage mode is a corresponding usage mode when the electronic apparatus is in a normal working status.

(38) The electronic apparatus according to (37), wherein, the electronic apparatus further includes:

A third determining chip for determining the first voice recognition module corresponding to the first usage mode after controlling the electronic apparatus to enter the first usage mode;

The processing chip is specifically for recognizing the first voice information using the second recognition model different from the first recognition model by the first voice recognition module to obtain the second recognition result when the first recognition result conforms to the first preset condition.

(39) The electronic apparatus according to (38), wherein, the electronic apparatus further includes:

A second recording chip for recording the third voice information input by the user between a first moment of generating the first control instruction and a second moment of switching to the first usage mode when there is the first control instruction after determining whether there is the first control instruction for controlling the electronic apparatus to enter the first usage mode.

(40) The electronic apparatus according to (39), wherein, the sound acquiring unit is specifically for:

Acquiring first sub-voice information that has not been carried out voice recognition by the second voice recognition module in the third voice information, the first sub-voice information being the first voice information.

Here, those skilled in the art can understand that, the above configurations of (15) to (40) are described by taking the technical features of the information processing method and electronic apparatus according to the second to the seventh embodiments of the present invention to be incorporated into the information processing method and electronic apparatus according to the first embodiment of the present invention as example, the technical features of the information processing method and electronic apparatus according to the first embodiment of the present invention can also be incorporated into the information processing method and electronic apparatus according to the second to the seventh embodiments of the present invention, the embodiments of the present invention do not make any limitation thereto.

When the information processing method and electronic apparatus according to the first embodiment of the present invention are combined with the information processing method and electronic apparatus according to the eighth embodiment the present invention, the information processing method and electronic apparatus according to the embodiments of the present invention can be configured as follows:

(41) The method according to any one of (1) to (7), wherein:

The electronic apparatus includes a first processing unit whose power consumption is a first power consumption and a second processing unit connected to the first processing unit, wherein, the power consumption of the second processing unit is a second power consumption which is larger than the first power consumption, and the second processing unit having voice recognition service, Obtaining the first voice information specifically is:

The first processing unit obtaining the first voice information of a first user when the second processing unit is in a disabled status;

Recognizing the first voice information by the first recognition model to obtain the first recognition result specifically is:

The first processing unit recognizing the first voice information by the first recognition model to obtain the first recognition result;

Deciding whether the first recognition result conforms to the first preset condition specifically is:

The first processing unit deciding whether the first recognition result conforms to the first preset condition;

Recognizing the first voice information by the second recognition model different from the first recognition model to obtain the second recognition result when the first recognition result conforms to the first preset condition specifically is:

The first processing unit recognizing the first voice information by the second recognition model different from the first recognition model to obtain the second recognition result when the first recognition result conforms to the first preset condition;

Controlling the electronic apparatus to execute a corresponding control instruction based on the second recognition result specifically is:

The first processing unit generating a trigger instruction based on the second recognition result and sending the trigger instruction to the second processing unit to make the second processing unit be in the enabled status;

The second processing unit obtaining the second voice information of the first user;

The second processing unit generating a first acoustic control instruction corresponding to the second voice information based on correspondence relationship between the voice information and the acoustic control instruction.

(42) The method according to (41), wherein, before the first processing unit obtaining the first voice information of the first user when the second processing unit is in the disabled status, the method further includes:

When the first processing unit is in the disabled status, obtaining an ON instruction, and executing the ON instruction to make the first processing unit be in the enabled status.

(43) The method according to (41), wherein, the first processing unit deciding whether the first recognition result satisfies the first preset condition when the first voice information includes the first voiceprint information of the first user specifically is:

The first processing unit deciding whether the first voiceprint information matches pre-stored standard voiceprint information of the first user.

(44) The method according to (41), wherein, the second processing unit obtaining the second voice information of the first user specifically is:

The second processing unit obtaining the first voice information from the first processing unit as the second voice information.

(45) The method according to (44), wherein, after the second processing unit obtaining the first voice information from the first processing unit, the method further includes:

Sending an OFF instruction to the first processing unit after the second processing unit obtaining the first voice information, and the first processing unit executing the OFF instruction to make the first processing unit be in the disabled status.

(46) The method according to (44), wherein, the second processing unit generating the first acoustic control instruction corresponding to the second voice information based on the correspondence relationship between the voice information and the acoustic control instruction specifically includes:

Deciding whether there is content information conforming to the second preset condition in the first voice information;

When there is the content information conforming to the second preset condition in the first voice information, the second processing unit generating the first acoustic control instruction corresponding to the second voice information based on the correspondence relationship between the voice information and the acoustic control instruction.

(47) The method according to (41), wherein, the second processing unit obtaining the second voice information of the first user specifically includes:

Deciding whether there is content information conforming to the second preset condition in the first voice information;

When there is no content information conforming to the second preset condition in the first voice information, the second processing unit obtaining the second voice information different from the first voice information.

(48) The method according to (47), wherein, the second processing unit generating the first acoustic control instruction corresponding to the second voice information based on the correspondence relationship between the voice information and the acoustic control instruction specifically includes:

Deciding whether there is content information conforming to the second preset condition in the second voice information;

When there is the content information conforming to the second preset condition in the second voice information, the second processing unit generating the first acoustic control instruction corresponding to the second voice information based on the correspondence relationship between the voice information and the acoustic control instruction.

(49) The electronic apparatus according to any one of (8) to (14), wherein, the processing chip includes:

A first processing unit whose power consumption is a first power consumption,

And the control chip includes:

A second processing unit connected to the first processing unit, wherein, the power consumption of the second processing unit is a second power consumption which is larger than the first power consumption, and the second processing unit has voice recognition service, wherein, When the second processing unit is in the disabled status, the first processing unit is specifically for obtaining the first voice information of the first user from the sound acquiring unit; recognizing the first voice information by the first recognition model to obtain the first recognition result; deciding whether the first recognition result conforms to the first preset condition; recognizing the first voice information by the second recognition model different from the first recognition model to obtain the second recognition result when the first recognition result conforms to the first preset condition; and generating a trigger instruction based on the second recognition result and sending the trigger instruction to the second processing unit to make the second processing unit be in the enabled status;

The second processing unit is specifically for, after being in the enabled status based on the trigger instruction, obtaining the second voice information of the first user; and generating the first acoustic control instruction corresponding to the second voice information based on the correspondence relationship between the voice information and the acoustic control instruction.

(50) The electronic apparatus according to (49), wherein, the electronic apparatus further includes:

An executing unit for obtaining an ON instruction when the first processing unit is in the disabled status, and executing the ON instruction to make the first processing unit be in the enabled status.

(51) The electronic apparatus according to (49), wherein, when the first voice information includes the first voiceprint information of the first user, the first processing unit specifically is:

A unit for the first processing unit deciding whether the first voiceprint information matches pre-stored standard voiceprint information of the first user.

(52) The electronic apparatus according to (49), wherein, the processing chip further includes a deleting unit for deleting the first voice information when the first voice information does not satisfy the first preset condition.

(53) The electronic apparatus according to (49), wherein, the second processing unit specifically is:

A unit for obtaining the first voice information from the first processing unit as the second voice information.

(54) The electronic apparatus according to (53), wherein, the electronic apparatus further includes:

A sending unit for sending an OFF instruction to the first processing unit when the second processing unit obtains the first voice information, to make the first processing unit be in the disabled status by executing the OFF instruction.

(55) The electronic apparatus according to (53), wherein, the second processing unit specifically includes:

A first deciding subunit for deciding whether there is content information conforming to the second preset condition in the first voice information;

A first generating subunit for, when there is the content information conforming to the second preset condition in the first voice information, generating the first acoustic control instruction corresponding to the second voice information based on the correspondence relationship between the voice information and the acoustic control instruction.

(56) The electronic apparatus according to (49), wherein, the second processing unit specifically includes:

A second deciding subunit for deciding whether there is content information conforming to the second preset condition in the first voice information;

An obtaining subunit for, when there is no content information conforming to the second preset condition in the first voice information, obtaining the second voice information different from the first voice information.

(57) The electronic apparatus according to (56), wherein, the second processing unit specifically includes:

A third deciding subunit for deciding whether there is content information conforming to the third preset condition in the second voice information;

A second generating subunit for, when there is the content information conforming to the second preset condition in the second voice information, generating the first acoustic control instruction corresponding to the second voice information based on the correspondence relationship between the voice information and the acoustic control instruction.

Here, those skilled in the art can understand that, the above configurations of (41) to (57) are described by taking the technical features of the information processing method and electronic apparatus according to the eighth embodiment of the present invention to be incorporated into the information processing method and electronic apparatus according to the first embodiment of the present invention as example, the technical features of the information processing method and electronic apparatus according to the first embodiment of the present invention can also be incorporated into the information processing method and electronic apparatus according to the eighth embodiment of the present invention, the embodiments of the present invention do not make any limitation thereto.

When all of the information processing method and electronic apparatus according to the first embodiment of the present invention, the information processing method and electronic apparatus according to the second to the seventh embodiments of the present invention and the information processing method and electronic apparatus according to the eighth embodiment of the present invention are combined together, the information processing method and electronic apparatus according to the embodiments of the present invention can be configured as follows:

(58) The method according to any one of (15) to (27), wherein, the electronic apparatus includes a first processing unit whose power consumption is a first power consumption, and a second processing unit connected to the first processing unit, wherein, the power consumption of the second processing unit is a second power consumption which is larger than the first power consumption, and the second processing unit has voice recognition service, Obtaining the first voice information specifically is:

The first processing unit obtaining the first voice information of the first user when the second processing unit is in the disabled status;

Recognizing the first voice information by the first recognition model to obtain the first recognition result specifically is:

The first processing unit recognizing the first voice information by the first recognition model to obtain the first recognition result;

Deciding whether the first recognition result conforms to the first preset condition specifically is:

The first processing unit deciding whether the first recognition result conforms to the first preset condition;

Recognizing the first voice information using the second recognition model different from the first recognition model by the first voice recognition module to obtain the second recognition result when the first recognition result conforms to the first preset condition specifically is:

The first processing unit recognizing the first voice information by the second recognition model different from the first recognition model by using the first voice recognition module to obtain the second recognition result when the first recognition result conforms to the first preset condition;

Controlling the electronic apparatus to execute a corresponding control instruction based on the second recognition result specifically is:

The first processing unit generating a trigger instruction based on the second recognition result and sending the trigger instruction to the second processing unit to make the second processing unit be in the enabled status;

The second processing unit obtaining the second voice information of the first user;

The second processing unit generating a first acoustic control instruction corresponding to the second voice information based on correspondence relationship between the voice information and the acoustic control instruction.

(59) The electronic apparatus according to any one of (28) to (40), wherein, the processing chip includes:

A first processing unit whose power consumption is a first power consumption,

And the control chip includes:

A second processing unit connected to the first processing unit, wherein, the power consumption of the second processing unit is a second power consumption which is larger than the first power consumption, and the second processing unit has voice recognition service, wherein, When the second processing unit is in the disabled status, the first processing unit is specifically for obtaining the first voice information of the first user from the sound acquiring unit; recognizing the first voice information by the first recognition model to obtain the first recognition result; deciding whether the first recognition result conforms to the first preset condition; recognizing the first voice information by the second recognition model different from the first recognition model by using the first voice recognition module to obtain the second recognition result when the first recognition result conforms to the first preset condition; and generating a trigger instruction based on the second recognition result and sending the trigger instruction to the second processing unit to make the second processing unit be in the enabled status;

The second processing unit is specifically for, after being in the enabled status based on the trigger instruction, obtaining the second voice information of the first user; and generating the first acoustic control instruction corresponding to the second voice information based on the correspondence relationship between the voice information and the acoustic control instruction.

Similarly, the respective technical features of all of the information processing method and electronic apparatus according to the first embodiment of the present invention, the information processing method and electronic apparatus according to the second to the seventh embodiments of the present invention, and the information processing method and electronic apparatus according to the eighth embodiment of the present invention can be combined with each other arbitrarily, those skilled in the art can obtain other configurations of the information processing method and electronic apparatus according to the embodiments of the present invention in same way as the above (58) and (59), the embodiments of the present invention do not make any limitation thereto.

When the information processing method and electronic apparatus according to the second to the seventh embodiments of the present invention is applied separately, the information processing method and electronic apparatus according to the embodiments of the present invention can be configured as follows:

(60) A voice recognition method applied in an electronic apparatus, wherein, the electronic apparatus includes at least two different voice recognition modules, the method includes:

Obtaining first voice information to be recognized;

Obtaining that the current mode of the electronic apparatus is a first usage mode;

Determining that the voice recognition module corresponding to the first usage mode is a first voice recognition module in the at least two different voice recognition modules based on correspondence relationship between the usage mode and the voice recognition module;

Recognizing the voice information to be recognized by the first voice recognition module to obtain a recognition result.

(61) The method according to (60), wherein, before obtaining that the current mode of the electronic apparatus is the first usage mode, the method further includes:

Detecting to obtain second voice information to be recognized when the electronic apparatus is in a second usage mode;

Recognizing the second voice information to be recognized by a second voice recognition module corresponding to the second usage mode in the at least two different voice recognition modules, to determine whether there is a first control instruction for controlling the electronic apparatus to enter the first usage mode;

Controlling the electronic apparatus to enter the first usage mode when there is the first control instruction.

(62) The method according to (61), wherein, after determining whether there is the first control instruction for controlling the electronic apparatus to enter the first usage mode, the method further includes:

Recording first voice information input by the user between a first moment of generating the first control instruction and a second moment of switching to the first usage mode when there is the first control instruction.

(63) The method according to (62), wherein, after recording the first voice information input by the user when the electronic apparatus switches to the first usage mode from the second usage mode, the method further includes:

Storing the first voice information in a memory of the electronic apparatus.

(64) The method according to (63), wherein, obtaining first voice information to be recognized specifically includes:

Reading the first voice information from the memory;

Acquiring first sub-voice information that has not been carried out voice recognition by the second voice recognition module in the first voice information, the first sub-voice information being the first voice information to be recognized.

(65) The method according to (61), wherein, after controlling the electronic apparatus to enter the first usage mode, the method further includes:

Deciding whether there is a second control instruction for enabling the first voice recognition module;

Executing a step of determining the voice recognition module corresponding to the first usage mode as the first voice recognition module based on the correspondence relationship between the usage mode and the voice recognition module after deciding there is the second control instruction.

(66) The method according to (61), wherein, after determining that the voice recognition module corresponding to the first usage mode is the first voice recognition module, the method further includes:

Disabling the second voice recognition module.

(67) The method according to any one of (60) to (66), wherein, the first voice recognition module is a software voice recognition module or a hardware voice recognition module, and the second voice recognition module is the hardware voice recognition module;

The first usage mode is a usage mode corresponding to an ON status, and the second usage mode is an OFF/STANDBY mode.

(68) The method according to any one of (60) to (66), wherein, determining that the voice recognition module corresponding to the first usage mode is the first voice recognition module based on the correspondence relationship between the usage mode and the voice recognition module specifically is:

Determining that the voice recognition module corresponding to the first usage mode is the software voice recognition module based on the correspondence relationship between the usage mode and the voice recognition module when the first usage mode is a usage mode whose power consumption is larger than a first preset threshold;

Determining that the voice recognition module corresponding to the first usage mode is the hardware voice recognition module when the first usage mode is a usage mode whose power consumption is less than the first preset threshold.

(69) An information processing method applied in an electronic apparatus, wherein, the method includes:

Detecting to obtain second voice information to be recognized when the electronic apparatus is in a second usage mode, wherein, the second usage mode is a corresponding usage mode when the electronic apparatus is in a power saving status;

Carrying out voice recognition to second voice information to be recognized by a second voice recognition module corresponding to the second usage mode, to determine whether there is a first control instruction for controlling the electronic apparatus to enter the first usage mode;

Controlling the electronic apparatus to enter the first usage mode when there is the first control instruction, wherein, the first usage mode is a corresponding usage mode when the electronic apparatus is in a normal working status.

(70) The method according to (69), wherein, after controlling the electronic apparatus to enter the first usage mode, the method further includes:

Determining the first voice recognition module corresponding to the first usage mode;

Acquiring first voice information to be recognized;

Recognizing the first voice information to be recognized based on the first voice recognition module to obtain at least a recognition result.

(71) The method according to (70), wherein, after determining whether there is the first control instruction for controlling the electronic apparatus to enter the first usage mode, the method further includes:

Recording first voice information input by the user between a first moment of generating the first control instruction and a second moment of switching to the first usage mode when there is the first control instruction.

(72) The method according to (71), wherein, acquiring the first voice information to be recognized specifically is:

Acquiring first sub-voice information that has not been carried out voice recognition by the second voice recognition module in the first voice information, the first sub-voice information being the first voice information to be recognized.

(73) An electronic apparatus, wherein, the electronic apparatus includes at least two different voice recognition modules, the electronic apparatus further includes:

A first obtaining chip for obtaining first voice information to be recognized;

A second obtaining chip for obtaining that the current mode of the electronic apparatus is a first usage mode;

A first determining chip for determining that the voice recognition module corresponding to the first usage mode is the first voice recognition module in the at least two different voice recognition modules based on the correspondence relationship between the usage mode and the voice recognition module;

A third obtaining chip for obtaining a recognition result by recognizing the voice information to be recognized by the first voice recognition module.

(74) The electronic apparatus according to (73), wherein, the electronic apparatus further includes:

A first detecting chip for detecting whether there is a first control instruction for controlling the electronic apparatus to enter the first usage mode by the second voice recognition module corresponding to the second usage mode in the at least two different voice recognition modules when the electronic apparatus is in the second usage mode before obtaining that the current mode of the electronic apparatus is the first usage mode;

A first control chip for controlling the electronic apparatus to enter the first usage mode when there is the first control instruction.

(75) The electronic apparatus according to (74), wherein, the electronic apparatus further includes:

A first recording chip for recording the first voice information input by the user between a first moment of generating the first control instruction and a second moment of switching to the first usage mode when there is the first control instruction after determining whether there is the first control instruction for controlling the electronic apparatus to enter the first usage mode.

(76) The electronic apparatus according to (75), wherein, the electronic apparatus further includes:

A storage chip for storing the first voice information in a memory of the electronic apparatus after recording the first voice information input by the user when the electronic apparatus is switched to the first usage mode from the second usage mode.

(77) The electronic apparatus according to (76), wherein, the first obtaining chip specifically includes:

A reading sub-chip for reading the first voice information from the memory;

An acquiring sub-chip for acquiring first sub-voice information that has not been carried out voice recognition by the second voice recognition module in the first voice information, the first voice information being the first voice information to be recognized.

(78) The electronic apparatus according to (74), wherein, the electronic apparatus further includes:

A deciding chip for deciding whether there is a second control instruction for enabling the first voice recognition module after controlling the electronic apparatus to enter the first usage mode; and Executing a step of determining the voice recognition module corresponding to the first usage mode as the first voice recognition module based on the correspondence relationship between the usage mode and the voice recognition module after deciding there is the second control instruction.

(79) The electronic apparatus according to (74), wherein, the electronic apparatus further includes:

A disabling chip for disabling the second voice recognition module after determining that the voice recognition module corresponding to the first usage mode is the first voice recognition module.

(80) The electronic apparatus according to any one of (73) to (79), wherein, the first voice recognition module is a software voice recognition module or a hardware voice recognition module, and the second voice recognition module is a hardware voice recognition module;

The first usage mode is a usage mode corresponding to an ON status, and the second usage mode is an OFF/STANDBY mode.

(81) The electronic apparatus according to any one of (73) to (79), wherein, the first determining chip specifically includes:

A first determining sub-chip for determining that the voice recognition module corresponding to the first usage mode is the software voice recognition module based on the correspondence relationship between the usage mode and the voice recognition module when the first usage mode is a usage mode whose power consumption is larger than a first preset threshold;

A second determining sub-chip for determining that the voice recognition module corresponding to the first usage mode is the hardware voice recognition module when the first usage mode is a usage mode whose power consumption is less than the first preset threshold.

(82) An electronic apparatus, including:

A second detecting chip for detecting to obtain second voice information to be recognized when the electronic apparatus is in a second usage mode, wherein, the second usage mode is a corresponding usage mode when the electronic apparatus is in a power saving status;

A second determining chip for determining whether there is a first control instruction for controlling the electronic apparatus to enter the first usage mode by carrying out voice recognition to the second voice information to be recognized by the second voice recognition module corresponding to the second usage mode;

A second control chip for controlling the electronic apparatus to enter the first usage mode when there is the first control instruction, wherein, the first usage mode is a corresponding usage mode when the electronic apparatus is in a normal working status.

(83) The electronic apparatus according to (82), wherein, the electronic apparatus further includes:

A third determining chip for determining the first voice recognition module corresponding to the first usage mode after controlling the electronic apparatus to enter the first usage mode;

An acquiring chip for acquiring first voice information to be recognized;

A fourth obtaining chip for recognizing the first voice information to be recognized by the first voice recognition module to obtain at least a recognition result.

(84) The electronic apparatus according to (83), wherein, the electronic apparatus further includes:

A second recording chip for recording the first voice information input by the user between a first moment of generating the first control instruction and a second moment of switching to the first usage mode when there is the first control instruction after determining whether there is the first control instruction for controlling the electronic apparatus to enter the first usage mode.

(85) The electronic apparatus according to (84), wherein, the acquiring chip is specifically for:

Acquiring first sub-voice information that has not been carried out voice recognition by the second voice recognition module in the first voice information, the first sub-voice information being the first voice information to be recognized.

When the information processing method and electronic apparatus according to the second to the seventh embodiments of the present invention are combined with the information processing method and electronic apparatus according to the eighth embodiment the present invention, the information processing method and electronic apparatus according to the embodiments of the present invention can be configured as follows:

(86) The method according to any one of (60) to (72), wherein, the electronic apparatus includes a first processing unit whose power consumption is a first power consumption and a second processing unit connected to the first processing unit, the power consumption of the second processing unit is a second power consumption which is larger than the first power consumption, Obtaining first voice information to be recognized specifically is:

When the second processing unit is in a disabled status, the first processing unit obtaining first sound information of a first user;

Recognizing the voice information to be recognized by the first voice recognition module to obtain a recognition result specifically is:

The first processing unit deciding whether the first sound information satisfies a first preset condition;

The first processing unit generating a trigger instruction and sending the trigger instruction to the second processing unit to make the second processing unit be in enabled status when the first sound information satisfies the first preset condition;

The second processing unit obtaining second sound information of the first user;

The second processing unit generating a first acoustic control instruction corresponding to the second sound information based on correspondence relationship between the sound information and the acoustic control instruction.

(87) The method according to (86), wherein, before the first processing unit obtaining the first sound information of the first user when the second processing unit is in the disabled status, the method further includes:

When the first processing unit is in the disabled status, obtaining an ON instruction, and executing the ON instruction to make the first processing unit be in the enabled status.

(88) The method according to (86), wherein, the first processing unit deciding whether the first recognition result satisfies the first preset condition when the first voice information includes the first voiceprint information of the first user specifically is:

The first processing unit deciding whether the first voiceprint information matches pre-stored standard voiceprint information of the first user.

(89) The method according to (86), wherein, after the first processing unit deciding whether the first sound information satisfies the first preset condition, the method further includes:

When the first sound information does not satisfy the first preset condition, the first processing unit deleting the first sound information.

(90) The method according to (86), wherein, the second processing unit obtaining the second sound information of the first user specifically is:

The second processing unit obtaining the first sound information from the first processing unit as the second sound information.

(91) The method according to (90), wherein, after the second processing unit obtaining the first sound information from the first processing unit, the method further includes:

After the second processing unit obtaining the first sound information, sending an OFF instruction to the first processing unit, and the first processing unit executing the OFF instruction to make the first processing unit be in the disabled status.

(92) The method according to (90), wherein, the second processing unit generating the first acoustic control instruction corresponding to the second sound information based on the correspondence relationship between the sound information and the acoustic control instruction specifically includes:

Deciding whether there is content information conforming to the second preset condition in the first sound information;

When there is the content information conforming to the second preset condition in the first sound information, the second processing unit generating the first acoustic control instruction corresponding to the second sound information based on the correspondence relationship between the sound information and the acoustic control instruction.

(93) The method according to (86), wherein, the second processing unit obtaining the second sound information of the first user specifically includes:

Deciding whether there is content information conforming to the second preset condition in the first sound information;

When there is no content information conforming to the second preset condition in the first sound information, the second processing unit obtaining the second sound information different from the first sound information.

(94) The method according to (93), wherein, the second processing unit generating the first acoustic control instruction corresponding to the second sound information based on the correspondence relationship between the sound information and the acoustic control instruction specifically includes:

Deciding whether there is content information conforming to the second preset condition in the second sound information;

When there is the content information conforming to the second preset condition in the second sound information, the second processing unit generating the first acoustic control instruction corresponding to the second sound information based on the correspondence relationship between the sound information and the acoustic control instruction.

(95) The electronic apparatus according to any one of (73) to (85), wherein, the electronic apparatus includes:

A first processing unit whose power consumption is a first power consumption,

A second processing unit connected to the first processing unit, wherein, the power consumption of the second processing unit is a second power consumption which is larger than the first power consumption, and When the second processing unit is in the disabled status, the first processing unit is for obtaining the first sound information of the first user from the first obtaining chip; and deciding whether the first sound information satisfies the first preset condition; and generating a trigger instruction and sending the trigger instruction to the second processing unit when the first sound information satisfies the first preset condition;

The second processing unit is for, after being in the enabled status based on the trigger instruction, obtaining the second sound information of the first user; and generating the first acoustic control instruction corresponding to the second sound information based on the correspondence relationship between the sound information and the acoustic control instruction.

(96) The electronic apparatus according to (95), wherein, the electronic apparatus further includes:

An executing unit for obtaining an ON instruction when the first processing unit is in the disabled status, and executing the ON instruction to make the first processing unit be in the enabled status.

(97) The electronic apparatus according to (95), wherein, when the first sound information includes the first voiceprint information of the first user, the first processing unit specifically is:

A unit for the first processing unit deciding whether the first voiceprint information matches pre-stored standard voiceprint information of the first user.

(98) The electronic apparatus according to (95), wherein, the electronic apparatus further includes a deleting unit for deleting the first sound information when the first sound information does not satisfy the first preset condition.

(99) The electronic apparatus according to (95), wherein, the second processing unit specifically is:

A unit for obtaining the first sound information from the first processing unit as the second sound information.

(100) The electronic apparatus according to (99), wherein, the electronic apparatus further includes:

A sending unit for sending an OFF instruction to the first processing unit when the second processing unit obtains the first sound information, to make the first processing unit be in the disabled status by executing the OFF instruction.

(101) The electronic apparatus according to (99), wherein, the second processing unit specifically includes:

A first deciding subunit for deciding whether there is content information conforming to the second preset condition in the first sound information;

A first generating subunit for, when there is the content information conforming to the second preset condition in the first sound information, generating the first acoustic control instruction corresponding to the second sound information based on the correspondence relationship between the sound information and the acoustic control instruction.

(102) The electronic apparatus according to (95), wherein, the second processing unit specifically includes:

A second deciding subunit for deciding whether there is content information conforming to the second preset condition in the first sound information;

An obtaining subunit for, when there is no content information conforming to the second preset condition in the first sound information, obtaining the second sound information different from the first sound information.

(103) The electronic apparatus according to (102), wherein, the second processing unit specifically includes:

A third deciding subunit for deciding whether there is content information conforming to the second preset condition in the second sound information;

A second generating subunit for, when there is the content information conforming to the second preset condition in the second sound information, generating the first acoustic control instruction corresponding to the second sound information based on the correspondence relationship between the sound information and the acoustic control instruction.

Here, those skilled in the art can understand that, the above configurations of (86) to (103) are described by taking the technical features of the information processing method and electronic apparatus according to the eighth embodiment of the present invention incorporating into the information processing method and electronic apparatus according to the second to the seventh embodiments of the present invention as example, the technical features of the information processing method and electronic apparatus according to the second to the seventh embodiment of the present invention can also be incorporated into the information processing method and electronic apparatus according to the eighth embodiment of the present invention, the embodiments of the present invention do not make any limitation thereto.

When the information processing method and electronic apparatus according to the eighth embodiment of the present invention are applied separately, the information processing method and electronic apparatus according to the embodiments of the present invention can be configured as follows:

(104) An information processing method applied in an electronic apparatus, wherein the electronic apparatus includes a first processing unit whose power consumption is a first power consumption and a second processing unit connected to the first processing unit, wherein, the power consumption of the second processing unit is a second power consumption which is larger than the first power consumption, the method including:

When the second processing unit is in a disabled status, the first processing unit obtaining first sound information of a first user;

The first processing unit deciding whether the first sound information satisfies a first preset condition;

The first processing unit generating a trigger instruction and sending the trigger instruction to the second processing unit to make the second processing unit be in enabled status when the first sound information satisfies the first preset condition;

The second processing unit obtaining second sound information of the first user;

The second processing unit generating a first acoustic control instruction corresponding to the second sound information based on correspondence relationship between the sound information and the acoustic control instruction.

(105) The method according to (104), wherein, before the first processing unit obtaining the first sound information of the first user when the second processing unit is in the disabled status, the method further includes:

When the first processing unit is in the disabled status, obtaining an ON instruction, and executing the ON instruction to make the first processing unit be in the enabled status.

(106) The method according to (104), wherein, the first processing unit deciding whether the first recognition result satisfies the first preset condition when the first voice information includes the first voiceprint information of the first user specifically is:

The first processing unit deciding whether the first voiceprint information matches pre-stored standard voiceprint information of the first user.

(107) The method according to (104), wherein, after the first processing unit deciding whether the first sound information satisfies the first preset condition, the method further includes:

When the first sound information does not satisfy the first preset condition, the first processing unit deleting the first sound information.

(108) The method according to (104), wherein, the second processing unit obtaining the second sound information of the first user specifically is:

The second processing unit obtaining the first sound information from the first processing unit as the second sound information.

(109) The method according to (108), wherein, after the second processing unit obtaining the first sound information from the first processing unit, the method further includes:

After the second processing unit obtaining the first sound information, sending an OFF instruction to the first processing unit, and the first processing unit executing the OFF instruction to make the first processing unit be in the disabled status.

(110) The method according to (108), wherein, the second processing unit generating the first acoustic control instruction corresponding to the second sound information based on the correspondence relationship between the sound information and the acoustic control instruction specifically includes:

Deciding whether there is content information conforming to the second preset condition in the first sound information;

When there is the content information conforming to the second preset condition in the first sound information, the second processing unit generating the first acoustic control instruction corresponding to the second sound information based on the correspondence relationship between the sound information and the acoustic control instruction.

(111) The method according to (104), wherein, the second processing unit obtaining the second sound information of the first user specifically includes:

Deciding whether there is content information conforming to the second preset condition in the first sound information;

When there is no content information conforming to the second preset condition in the first sound information, the second processing unit obtaining the second sound information different from the first sound information.

(112) The method according to (111), wherein, the second processing unit generating the first acoustic control instruction corresponding to the second sound information based on the correspondence relationship between the sound information and the acoustic control instruction specifically includes:

Deciding whether there is content information conforming to the second preset condition in the second sound information;

When there is the content information conforming to the second preset condition in the second sound information, the second processing unit generating the first acoustic control instruction corresponding to the second sound information based on the correspondence relationship between the sound information and the acoustic control instruction.

(113) An electronic apparatus for information processing, wherein, the electronic apparatus includes:

A first processing unit whose power consumption is a first power consumption,

A second processing unit connected to the first processing unit, wherein, the power consumption of the second processing unit is a second power consumption which is larger than the first power consumption, and, When the second processing unit is in the disabled status, the first processing unit is for obtaining first sound information of a first user; and deciding whether the first sound information satisfies a first preset condition; and generating a trigger instruction and sending the trigger instruction to the second processing unit when the first sound information satisfies the first preset condition;

The second processing unit is for, after being in the enabled status based on the trigger instruction, obtaining second sound information of the first user; and generating a first acoustic control instruction corresponding to the second sound information based on correspondence relationship between the sound information and the acoustic control instruction.

(114) The electronic apparatus according to (113), wherein, the electronic apparatus further includes:

An executing unit for obtaining an ON instruction when the first processing unit is in the disabled status, and executing the ON instruction to make the first processing unit be in the enabled status.

(115) The electronic apparatus according to (113), wherein, when the first sound information includes a first voiceprint information of the first user, the first processing unit specifically is:

A unit for the first processing unit deciding whether the first voiceprint information matches pre-stored standard voiceprint information of the first user.

(116) The electronic apparatus according to (113), wherein, the electronic apparatus further includes a deleting unit for deleting the first sound information when the first sound information does not satisfy the first preset condition.

(117) The electronic apparatus according to (113), wherein, the second processing unit specifically is:

A unit for obtaining the first sound information from the first processing unit as the second sound information.

(118) The electronic apparatus according to (117), wherein, the electronic apparatus further includes:

A sending unit for sending an OFF instruction to the first processing unit when the second processing unit obtains the first sound information, to make the first processing unit be in the disabled status by executing the OFF instruction.

(119) The electronic apparatus according to (117), wherein, the second processing unit specifically includes:

A first deciding subunit for deciding whether there is content information conforming to the second preset condition in the first sound information;

A first generating subunit for, when there is the content information conforming to the second preset condition in the first sound information, generating the first acoustic control instruction corresponding to the second sound information based on the correspondence relationship between the sound information and the acoustic control instruction.

(120) The electronic apparatus according to (113), wherein, the second processing unit specifically includes:

A second deciding subunit for deciding whether there is content information conforming to the second preset condition in the first sound information;

An obtaining subunit for, when there is no content information conforming to the second preset condition in the first sound information, obtaining the second sound information different from the first sound information.

(121) The electronic apparatus according to (120), wherein, the second processing unit specifically includes:

A third deciding subunit for deciding whether there is content information conforming to the second preset condition in the second sound information;

A second generating subunit for, when there is the content information conforming to the second preset condition in the second sound information, generating the first acoustic control instruction corresponding to the second sound information based on the correspondence relationship between the sound information and the acoustic control instruction.

Those skilled in the art should understand that, the embodiments of the present invention can be provided as method, system or computer program product. Therefore, the present invention can adopt forms of full hardware embodiment, full software embodiment, or embodiment combining software and hardware aspects. And, the present invention can adopt form of computer program product implemented on one or more computer usable storage medium (including, but not limited to, magnetic disk storage and optical memory or the like) including computer usable program code.

The present invention is described by referring to flow charts and/or block diagrams of method, apparatus (system) and computer program product according to the embodiments of the present invention. It should be understood that each flow and/or block in the flow chart and/or block diagram and the combination of the flow and/or block in the flow chart and/or block diagram can be implemented by computer program instruction. These computer program instructions can be provided to processors of a general purpose computer, a dedicated computer, an embedded processor or other programmable data processing apparatus to generate a machine, so that a device for implementing functions specified in one or more flows of the flow chart and/or one or more blocks of the block diagram is generated by the instruction executed by the processor of the computer or other programmable data processing apparatus.

These computer program instructions can also be stored computer readable storage which is able to direct the computer or other programmable data processing apparatus to operate in specific manners, so that the instruction stored in the computer readable storage generates manufactured article including commander equipment, the commander equipment implements functions specified by one or more flows in the flow chart and/or one or more blocks in the block diagram.

These computer program instruction can be loaded to computer or other programmable data processing apparatus, so that a series of operation steps are executed on the computer or other programmable apparatus to generate computer implemented process, so that the instruction executed on the computer or other programmable apparatus provide steps for implementing functions specified in one or more flows of the flow chart and/or one or more blocks of the block diagram.

Though the preferred embodiments of the present invention are described, those skilled in the art can make additional alterations and modifications to these embodiments in case of knowing the basic creative concept. Therefore, the append claims intend to be defined as including the preferable embodiments as well as all of the alterations and modifications fallen into the scope of the present invention.

It is obvious that those skilled in the art can make various modifications and variations to the present invention without departing from the spirits and scopes of the present invention. Thus, if these modifications and variations of the present invention fall within the scopes of the claims of the present invention and the equivalent technology, the present invention intends to comprise these modifications and variations.

The invention claimed is:

1. An information processing method applied in an electronic apparatus having a voice recognition service, the method comprising:
obtaining first voice information;
recognizing the first voice information by a first voice recognition model to obtain a first voice recognition result;
deciding whether the first voice recognition result conforms to a first preset condition;
recognizing the first voice information by a second voice recognition model different from the first voice recognition model to obtain a second voice recognition result when the first voice recognition result conforms to the first preset condition;
controlling the electronic apparatus to execute a corresponding control instruction based on the second voice recognition result;
wherein the electronic apparatus includes at least two different voice recognition modules and two usage modes, and a first usage mode in the two usage modes corresponds to a first voice recognition module in the at least two different voice recognition modules, wherein, the method further includes:
- detecting to obtain second voice information when the electronic apparatus is in a second usage mode;
- determining whether there is a first control instruction controlling the electronic apparatus to enter the first usage mode;
- recording third voice information input by the user between a first moment of generating the first control instruction and a second moment of switching to the first usage mode when there is the first control instruction; and
- controlling the electronic apparatus to enter the first usage mode when there is the first control instruction.

2. The method according to claim 1, wherein, when the first voice recognition result does not conform to the first preset condition, the method further comprises discarding the first voice information.

3. The method according to claim 1, wherein, before recognizing the first voice information by the first voice recognition model, the method further comprises:
- deciding whether the first voice information satisfies a second preset condition;
- discarding the first voice information when the first voice information does not satisfy the second preset condition; and
- executing a step of recognizing the first voice information by the first voice recognition model when the first voice information satisfies the second preset condition.

4. The method according to claim 1, wherein, recognizing the first voice information by the first voice recognition model to obtain the first voice recognition result comprises recognizing whether the user corresponding to the first voice information is a predetermined user to obtain the first voice recognition result; wherein, when the user corresponding to the first voice information is not the predetermined user, it represents that the first voice information does not satisfy the first preset condition, and when the user corresponding to the first voice information is the predetermined user, it represents that the first voice information satisfies the first preset condition.

5. The method according to claim 1, wherein, obtaining the first voice information comprises carrying out end-point detection to the first voice information to obtain the detected first voice information.

6. The method according to claim 1, wherein, when the first voice recognition result conforms to the first preset condition, recognizing the first voice information by the second voice recognition model different from the first voice recognition model to obtain the second voice recognition result comprises:
- recognizing the first voice information by the second voice recognition model to obtain a third voice recognition result; and,
- obtaining the second voice recognition result based on the first voice recognition result and the third voice recognition result.

7. The method according to claim 1, wherein, the voice recognition service is in an inactive state, and when the control instruction corresponding to the second voice recognition result is a wakening instruction, controlling the electronic apparatus to execute a corresponding control instruction based on the second voice recognition result comprises executing the wakening instruction to waken the voice recognition service.

8. The method according to claim 1, wherein the method further includes:
- obtaining that the current mode of the electronic apparatus is a first usage mode;
- determining the voice recognition module corresponding to the first usage mode is a first voice recognition module in the at least two different voice recognition modules based on correspondence relationship between the usage mode and the voice recognition module;
- recognizing the first voice information by the second voice recognition model different from the first voice recognition model to obtain the second voice recognition result when the first voice recognition result conforms to the first preset condition includes recognizing the first voice information using the second voice recognition model different from the first voice recognition model by the first voice recognition module to obtain the second voice recognition result when the first voice recognition result conforms to the first preset condition.

9. The method according to claim 8, further comprising:
- recognizing the second voice information by a second voice recognition module corresponding to the second usage mode in the at least two different voice recognition modules, to determine whether there is a first control instruction controlling the electronic apparatus to enter the first usage mode.

10. The method according to claim 1, wherein, after recording the third voice information input by the user when the electronic apparatus switches to the first usage mode from the second usage mode, the method further comprises storing the third voice information in a memory of the electronic apparatus.

11. The method according to claim 10, wherein, obtaining the first voice information comprises:
- reading the third voice information from the memory; and,
- acquiring first sub-voice information that has not been carried out voice recognition by the second voice recognition module in the third voice information, the first sub-voice information being the first voice information.

12. The method according to claim 8, wherein, after controlling the electronic apparatus to enter the first usage mode, the method further comprises:
- deciding whether there is a second control instruction for enabling the first voice recognition module; and
- executing a step of determining that the voice recognition module corresponding to the first usage mode is the first voice recognition module based on the correspondence relationship between the usage mode and the voice recognition module after deciding there is the second control instruction.

13. The method according to claim 8, wherein, determining that the voice recognition module corresponding to the first usage mode is the first voice recognition module based on the correspondence relationship between the usage mode and the voice recognition module comprises:
- determining that the voice recognition module corresponding to the first usage mode is a software voice recognition module based on the correspondence relationship between the usage mode and the voice recognition module when the first usage mode is a usage mode whose power consumption is larger than a first preset threshold; and,
- determining that the voice recognition module corresponding to the first usage mode is a hardware voice recognition module when the first usage mode is a usage mode whose power consumption is less than the first preset threshold.

14. The method according to claim 1, which is applied in an electronic apparatus, wherein, before obtaining the first voice information, the method further comprises:
    detecting to obtain fourth voice information when the electronic apparatus is in a second usage mode, the second usage mode being a corresponding usage mode when the electronic apparatus is in a power saving status;
    recognizing the fourth voice information by a second voice recognition module corresponding to the second usage mode, to determine whether there is a first control instruction for controlling the electronic apparatus to enter the first usage mode; and
    controlling the electronic apparatus to enter the first usage mode when there is the first control instruction, wherein the first usage mode is a corresponding usage mode when the electronic apparatus is in a normal working status.

15. The method according to claim 14, wherein, acquiring the first voice information comprises:
    determining the first voice recognition module corresponding to the first usage mode;
    acquiring the first voice information; and
    recognizing the first voice information by the second recognition model different from the first recognition model to obtain the second recognition result when the first recognition result conforms to the first preset condition comprising:
    recognizing the first voice information using the second recognition model different from the first recognition model by the first voice recognition module to obtain the second recognition result when the first recognition result conforms to the first preset condition.

16. The method according to claim 1, wherein:
    the electronic apparatus includes a first processing unit whose power consumption is a first power consumption and a second processing unit connected to the first processing unit, the power consumption of the second processing unit being a second power consumption which is larger than the first power consumption, and the second processing unit having voice recognition service,
    obtaining the first voice information comprises:
    the first processing unit obtaining the first voice information of a first user when the second processing unit is in a disabled status;
    recognizing the first voice information by the first recognition model to obtain the first recognition result comprises:
    the first processing unit recognizing the first voice information by the first voice recognition model to obtain the first recognition result;
    deciding whether the first voice recognition result conforms to the first preset condition comprises:
    the first processing unit deciding whether the first voice recognition result conforms to the first preset condition;
    recognizing the first voice information by the second voice recognition model different from the first voice recognition model to obtain the second voice recognition result when the first voice recognition result conforms to the first preset condition comprises:
    the first processing unit recognizing the first voice information by the second voice recognition model different from the first voice recognition model to obtain the second voice recognition result when the first voice recognition result conforms to the first preset condition;
    controlling the electronic apparatus to execute a corresponding control instruction based on the second voice recognition result comprises:
    the first processing unit generating a trigger instruction based on the second voice recognition result and sending the trigger instruction to the second processing unit to make the second processing unit be in an enabled status;
    the second processing unit obtaining the second voice information of the first user;
    the second processing unit generating a first acoustic control instruction corresponding to the second voice information based on correspondence relationship between the voice information and the acoustic control instruction.

17. The method according to claim 16, wherein, the second processing unit obtaining the second voice information of the first user comprises:
    deciding whether there is content information conforming to the second preset condition in the first voice information; and
    when there is no content information conforming to the second preset condition in the first voice information, the second processing unit obtaining the second voice information different from the first voice information.

18. An information processing method applied in an electronic apparatus including at least two different voice recognition modules and two usage modes, and a first usage mode in the two usage modes corresponds to a first voice recognition module in the at least two different voice recognition modules, the method comprising:
    obtaining first voice information to be recognized;
    obtaining that the current mode of the electronic apparatus is a first usage mode;
    determining that the voice recognition module corresponding to the first usage mode is a first voice recognition module in the at least two different voice recognition modules based on correspondence relationship between the usage mode and the voice recognition module; and
    recognizing the first voice information to be recognized by the first voice recognition module to obtain a voice recognition result;
    the method further includes:
    detecting to obtain second voice information when the electronic apparatus is in a second usage mode;
    determining whether there is a first control instruction controlling the electronic apparatus to enter the first usage mode;
    recording third voice information input by the user between a first moment of generating the first control instruction and a second moment of switching to the first usage mode when there is the first control instruction;
    controlling the electronic apparatus to enter the first usage mode when there is the first control instruction.

19. An information processing method applied in an electronic apparatus including a first processing unit whose power consumption is a first power consumption and a second processing unit connected to the first processing unit, wherein, the power consumption of the second processing unit is a second power consumption which is larger than the first power consumption, the method comprising:

when the second processing unit is in a disabled status, the first processing unit obtaining first sound information of a first user;

the first processing unit deciding whether the first sound information satisfies a first preset condition;

the first processing unit generating a trigger instruction and sending the trigger instruction to the second processing unit to make the second processing unit be in an enabled status when the first sound information satisfies the first preset condition;

the second processing unit obtaining second sound information of the first user; the second processing unit generating a first acoustic control instruction corresponding to the second sound information based on correspondence relationship between the sound information and the acoustic control instruction;

wherein the electronic apparatus includes at least two different voice recognition modules and two usage modes, and a first usage mode in the two usage modes corresponds to a first voice recognition module in the at least two different voice recognition modules, wherein the method further includes:

detecting to obtain second voice information when the electronic apparatus is in a second usage mode;

determining whether there is a first control instruction controlling the electronic apparatus to enter the first usage mode;

recording third voice information input by the user between a first moment of generating the first control instruction and a second moment of switching to the first usage mode when there is the first control instruction;

controlling the electronic apparatus to enter the first usage mode when there is the first control instruction.

* * * * *